United States Patent [19]

Yoshida

[11] Patent Number: 5,535,015
[45] Date of Patent: Jul. 9, 1996

[54] FACSIMILE APPARATUS FOR TRANSMITTING A PLURALITY OF ORIGINALS IN A SINGLE COMMUNICATION

[75] Inventor: Takehiro Yoshida, Tokyo, Japan

[73] Assignee: Canon Kabushiki Kaisha, Tokyo, Japan

[21] Appl. No.: 32,329

[22] Filed: Mar. 17, 1993

[30] Foreign Application Priority Data

Mar. 19, 1992 [JP] Japan .................................. 4-093702

[51] Int. Cl.⁶ .................................................. H04N 1/00
[52] U.S. Cl. ........................ 358/438; 358/405; 358/434
[58] Field of Search .................................. 358/400, 405, 358/436, 437, 438, 467, 434; H04N 1/00

[56] References Cited

U.S. PATENT DOCUMENTS

| | | | |
|---|---|---|---|
| 4,679,093 | 7/1987 | Yaguchi | 358/438 |
| 4,712,139 | 12/1987 | Kato | 358/439 |
| 4,723,172 | 2/1988 | Matsumoto | 358/468 |
| 5,029,313 | 7/1991 | Robinson et al. | 355/40 |
| 5,057,937 | 10/1991 | Muramatsu et al. | 358/405 |
| 5,084,770 | 1/1992 | Nakayama | 358/400 |
| 5,127,013 | 6/1992 | Yoshida | 358/404 |
| 5,177,548 | 1/1993 | Nakamura et al. | |
| 5,251,043 | 10/1993 | Hamano et al. | 358/444 |

FOREIGN PATENT DOCUMENTS

| | | |
|---|---|---|
| 62-216464 | 9/1987 | Japan . |
| 2-151167 | 6/1990 | Japan . |
| 6-268810 | 9/1994 | Japan . |

*Primary Examiner*—Kim Yen Vu
*Attorney, Agent, or Firm*—Fitzpatrick, Cella, Harper & Scinto

[57] ABSTRACT

A facsimile apparatus for transmitting a plurality of originals, each original comprising a plurality of sheets, in a single communication operation includes a reading unit for reading images of sheets of the plurality of originals, a recognition unit for recognizing a border between originals read by the reading unit, and a transmission unit for sequentially transmitting the images of the sheets of the plurality of originals read by the reading means, and for transmitting a signal representing a border between originals when a border between transmitted images of sheets corresponds to the border between the originals recognized by the recognition unit.

18 Claims, 17 Drawing Sheets

FACSIMILE APPARATUS FOR TRANSMITTING A PLURALITY OF ORIGINALS IN A SINGLE COMMUNICATION

BACKGROUND OF THE INVENTION

1. Field of the Invention

This invention relates to a facsimile apparatus which transmits information of a plurality of read originals in a single communication operation.

2. Description of the Related Art

There have been cases in which information of a plurality of originals is continuously read and transmitted in a single communication operation. That is, by transmitting information of a plurality of originals, each comprising a plurality of sheets, to the same communication partner in a single communication operation, only one preprocedure and one postprocedure are required, whereby the communication cost can be reduced.

Some facsimile apparatuses, in which information of read originals is stored in a memory and is transmitted at a predetermined time, have a mailpost communication function of communicating information of a plurality of read originals to be transmitted to the same communication partner by batch processing at a transmission time.

However, even if the receiver's apparatus has received images of a plurality of originals from the above-described apparatus and recorded the images, a user at the reception side may in some cases consider the recorded images as images of one original comprising a plurality of sheets, and deliver the recorded images of the plurality of originals to a single destination.

SUMMARY OF THE INVENTION

It is an object of the present invention to provide a facsimile apparatus which overcomes the above-described problem.

It is another object of the present invention to provide a facsimile apparatus which can transmit images of a plurality of originals so that they can be separately classified by the receiver's facsimile apparatus even though they have been received in a single communication operation.

It is still another object of the present invention to provide a facsimile apparatus which can separately classify images of a plurality of originals received in a single communication operation from the transmitter's facsimile apparatus.

According to one aspect of the present invention, a facsimile apparatus for transmitting a plurality of originals, each orginal comprising a plurality of sheets, in a single communication operation includes reading means for reading images of sheets of the plurality of originals, and recognition means for recognizing a border between originals read by the reading means. Transmission means are provided for sequentially transmitting the images of the sheets of the plurality of originals read by the reading means, and for transmitting a signal representing a border between originals when the borders between transmitted images of sheets corresponds to the borders between the originals recognized by the recognition means.

According to another aspect of the present invention, a facsimile apparatus for transmitting a plurality of originals, each original comprising a plurality of sheets, in a single communication operation includes reading means for reading images of sheets of the plurality of images. Recognition means are provided for recognizing a border between originals read by the reading means. Transmission means are provided for transmitting information indicating the number of the originals corresponding to the number of borders between originals recognized by the recognition means, and for transmitting the images of sheets of the originals read by the reading means.

According to yet another aspect of the present invention, a facsimile apparatus for transmitting a plurality of originals, each original comprising a plurality of sheets, in a single communication operation includes reception means for receiving images of the plurality of originals and signals indicating borders between the respective originals. Recording means are provided for recording the images of the originals received by the reception means on recording sheets. Classification means are provided for classifying the recording sheets recorded by the recording means into two categories in accordance with the signals indicating the borders between the respective originals received by the reception means.

The foregoing and other objects, advantages and features of the present invention will become more apparent from the following description of the preferred embodiments taken in conjunction with the accompanying drawings.

DESCRIPTION OF THE PREFERRED EMBODIMENTS

Figure 1:
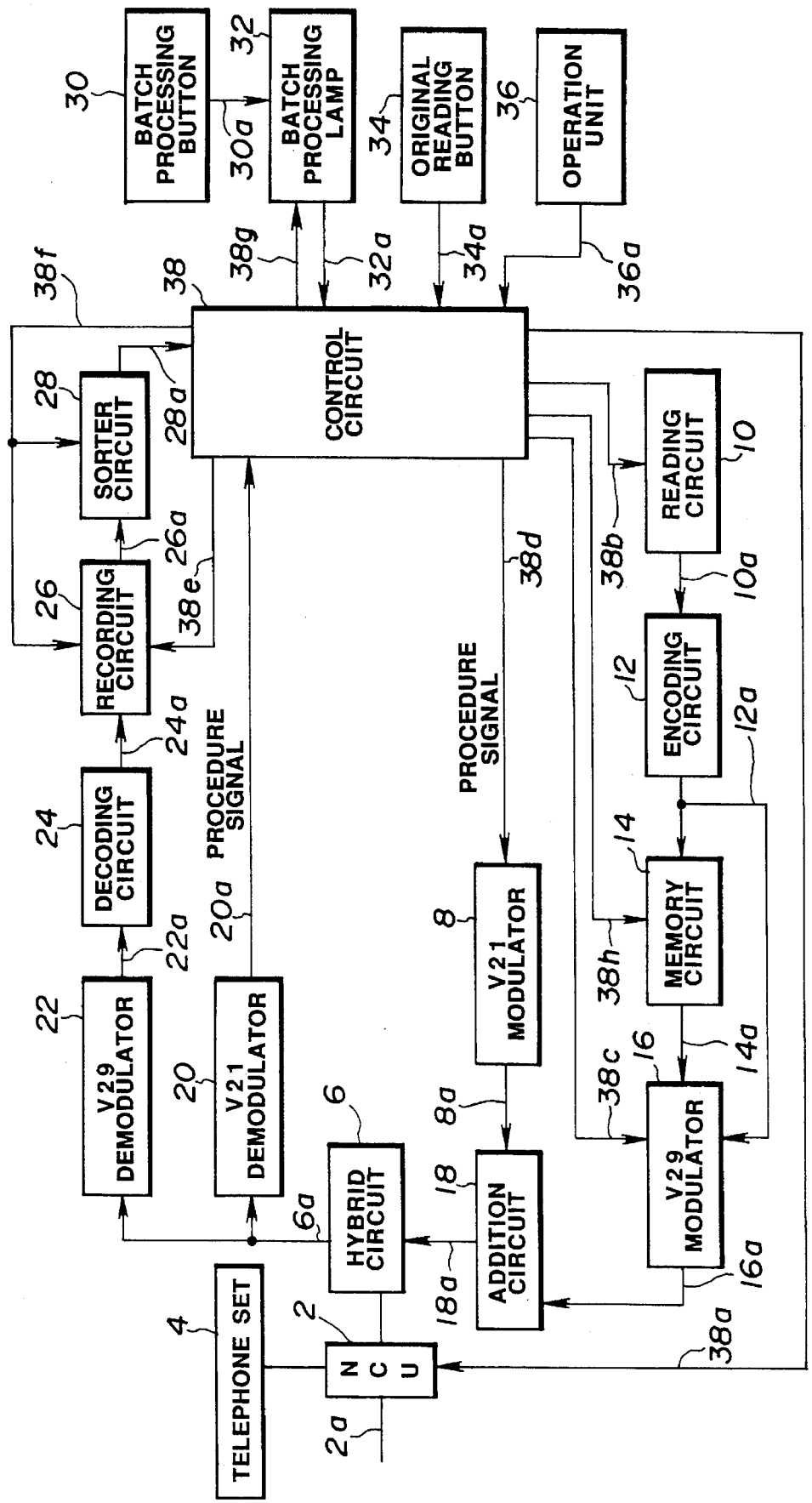
FIG. 1 is a block diagram illustrating a facsimile apparatus according to a first embodiment of the present invention.

FIG. 1 is a block diagram illustrating a facsimile apparatus according to a first embodiment of the present invention.

In FIG. 1, NCU (network control unit) 2 performs connection and control functions for connecting the apparatus to a telephone exchange network by connecting a line 2a to the network and for using the telephone network for audio communication or the like, switching to a data communication channel, holding of a loop, etc. If the signal level of a signal (on signal line 38a) from control circuit 38 is "0", that is, if the CML is turned off, NCU 2 connects telephone line 2a to telephone set 4. If the signal level is "1", NCU 2 connects telephone line 2a to the facsimile apparatus. In a normal state, telephone line 2a is connected to telephone set 4.

Hybrid circuit 6 separates transmitted signals from received signals. It transmits a transmission signal from addition circuit 18 to telephone line 2a via NCU 2, receives a signal from a communication partner via NCU 2, and transmits the received signal to V29 demodulator 22 and demodulator 20 via signal line 6a.

V21 modulator 8 performs modulation according to the known CCITT (Comité Consulatif International Tel égraphique et Téléphonique) recommendation V21. It modulates a procedure signal (on signal line 38d) from control circuit 38, and transmits the modulated signal to addition circuit 18 via signal line 8a.

When a signal of signal level "1" is output on signal line 38b, reading circuit 10 sequentially reads an image signal for one line in the main-scanning direction from an original whose images are to be transmitted (set on an original mount) to form a signal train comprising binary values representing white and black, and transmits the binary data to addition circuit 18 via signal line 10a. Reading circuit 10 comprises an image pickup device, such as a CCD (charge-coupled device) or the like, and an optical system.

Encoding circuit 12 encodes (MH (modified Huffman) coding or MR (modified Reed) coding)) read data, and outputs encoded data to memory circuit 14 and modulator 16 via signal line 12a.

Memory circuit 14 stores data from encoding circuit 12 in accordance with a signal on control line 38h from control circuit 38, and outputs the stored data to modulator 16 via signal line 14a.

When signals having signal levels "0" and "1" are output on signal line 38c from control circuit 38, V27ter or V29 modulator 16 inputs the encoded data on signal line 12a from encoding circuit 12, and encoded data on signal line 14a from memory circuit 14, respectively, and performs modulation according to the known CCITT recommendation V27ter (differential phase-shift keying) or V29 (orthogonal modulation). Modulated data output from modulator 16 are transmitted to addition circuit 18 via signal line 16a.

Addition circuit 18 adds outputs from modulators 8 and 16. The output of addition circuit 18 is transmitted to hybrid circuit 6.

V21 demodulator 20 performs demodulation according to the known CCITT recommendation V21. Demodulator 20 inputs a procedure signal from hybrid circuit 6 via signal line 6a, performs V21 demodulation, and transmits demodulated data to control circuit 38 via signal line 20a.

V27ter or V29 demodulator 22 performs demodulation according to the known CCITT recommendation V27ter or V29. Demodulator 22 inputs a modulated image signal from hybrid circuit 6, performs demodulation, and transmits demodulated data to decoding circuit 24 via signal line 22a.

Decoding circuit 24 decodes (MH decoding or MR decoding) demodulated data from demodulator 22. Decoded data are output to recording circuit 26 via signal line 24a.

Recording circuit 26 inputs the decoded data output from decoding circuit 24 from signal line 24a, and performs recording sequentially for every line of data onto recording paper. If a stapling command pulse is generated on signal line 38e, recording circuit 26 staples sheets of recording paper on which image information has been recorded. If the sorter number output to signal line 38f has a value of at least 1, recording circuit 26 outputs received information to signal line 26a. If the sorter number has a value of 0, recording circuit 26 does not output received information to signal line 26a.

If the sorter number output to signal line 38f has a value of at least 1, sorter circuit 28 stores sheets of recording paper on which received image information output to signal line 26a has been recorded in a bin of a sorter having an assigned number. In the present embodiment, the sorter is assumed to have ten bins. Sorter circuit 28 outputs information of whether or not sheets of recording paper are present in each bin having a sorter number to signal line 28a.

Batch processing button 30 is used to select a batch processing transmission mode for transmitting image information of a plurality of read originals in a single communication operation. Every time batch processing button 30 is depressed, a pulse is generated on signal line 30a.

Batch processing lamp 32 displays whether or not batch processing transmission (in which image information of a plurality of read originals is transmitted in a single communication operation) has been selected. When batch processing lamp 32 is lit, image information of a plurality of read originals can be transmitted in a single communication operation.

More specifically, after lighting batch processing lamp 32 by depressing batch processing button 30, the user sets sheets of the first original to be transmitted on the original mount, and depresses original-reading button 34. After the sheets of the first original have been read, sheets of the second original to be transmitted are set on the original mount, and original-reading button 34 is again depressed. After the sheets of the second original have been read, sheets of the third original to be transmitted are set on the original mount, and original-reading button 34 is again depressed. After the sheets of the third original have been read, a call is performed using a one-touch dial button, an abbreviation dial button or ten-key dial buttons, and image information of a plurality of originals is transmitted to an assigned communication partner in a single communication operation.

After the completion of the transmission of information of all the originals, batch processing lamp 32 is turned off. That is, if a lamp clearing command is output to signal line 38g, batch processing lamp 32 is turned off. Every time batch processing button 30 is depressed, batch processing lamp 32 is turned off or on in accordance with a pulse on signal line 30a.

When batch processing lamp 32 is turned off and on, signals of signal levels "0" and "1" are output on signal line 32a, respectively. Control circuit 38 thereby determines whether or not batch processing is selected.

Alternatively, the batch processing determination may be peformed by providing a flag indicating the presence or absence of batch processing within control circuit 38 so that the flag is changed every time batch processing button 30 is depressed.

Original-reading button 34 is used for reading sheets of each original set on the original mount when image information of a plurality of read originals is transmitted in a single communication operation.

Operation unit 36 includes a start button, a one-touch dial button, an abbreviation dial button, ten-key dial buttons and the like. Information provided by key depression is output to control circuit 38 via signal line 36a.

Control circuit 38 controls the entire facsimile apparatus of the present embodiment. Particularly, in the present embodiment, it controls reading of information of a plurality of originals to be transmitted, and transmission of the read information in a single communication operation, when batch processing transmission (in which information of a plurality of read originals is transmitted in a single communication operation) has been selected.

A border between consecutive originals is recognized by depressing the above-described original-reading button 34. The page number starts from page 1 for each original to be transmitted. The format of an MPS signal, which is a procedure signal, is changed at each border between originals and is transmitted to the communication partner's apparatus.

Figure 2:
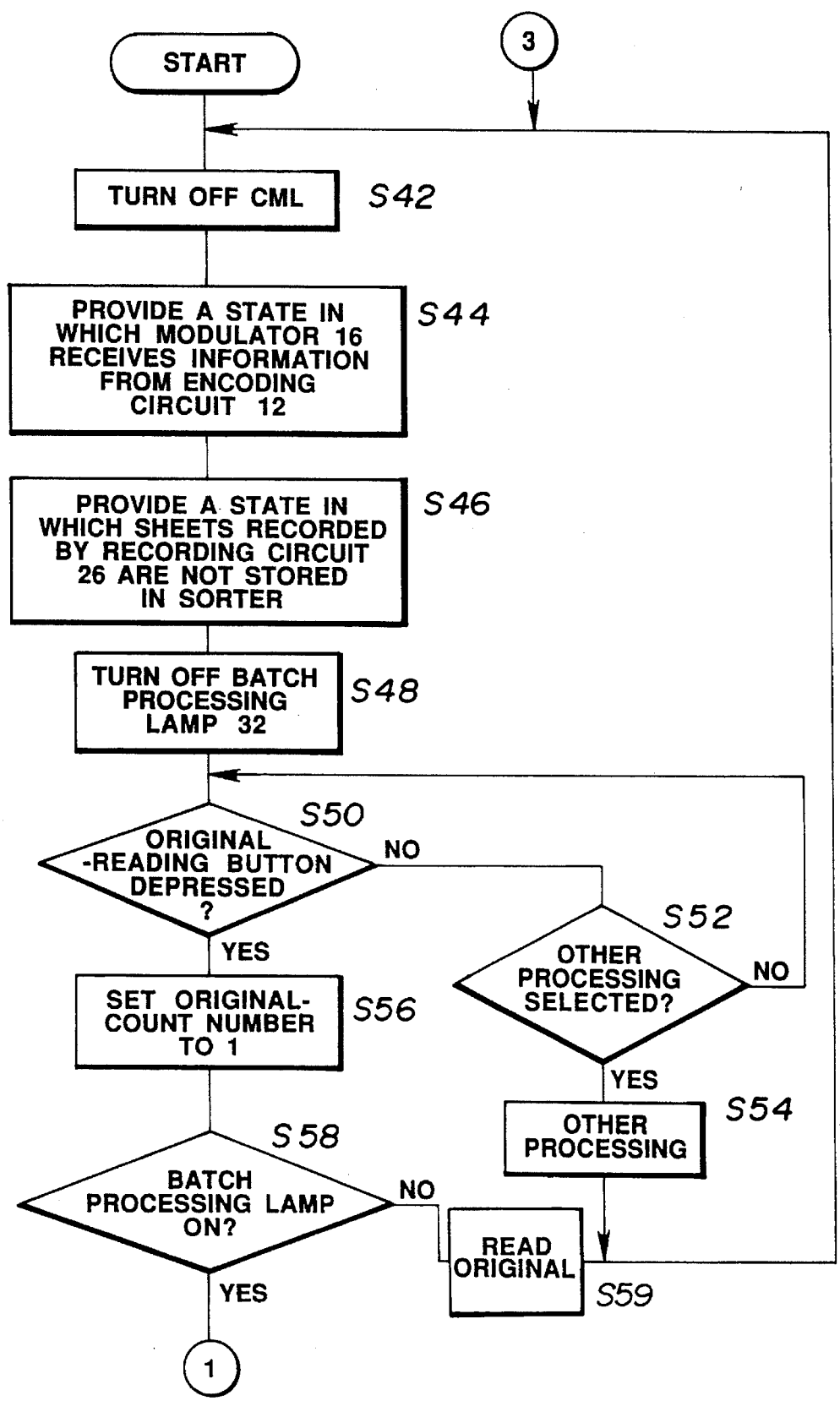
FIGS. 2 through 4 are flowcharts showing the operation of the first embodiment.
Figure 3:
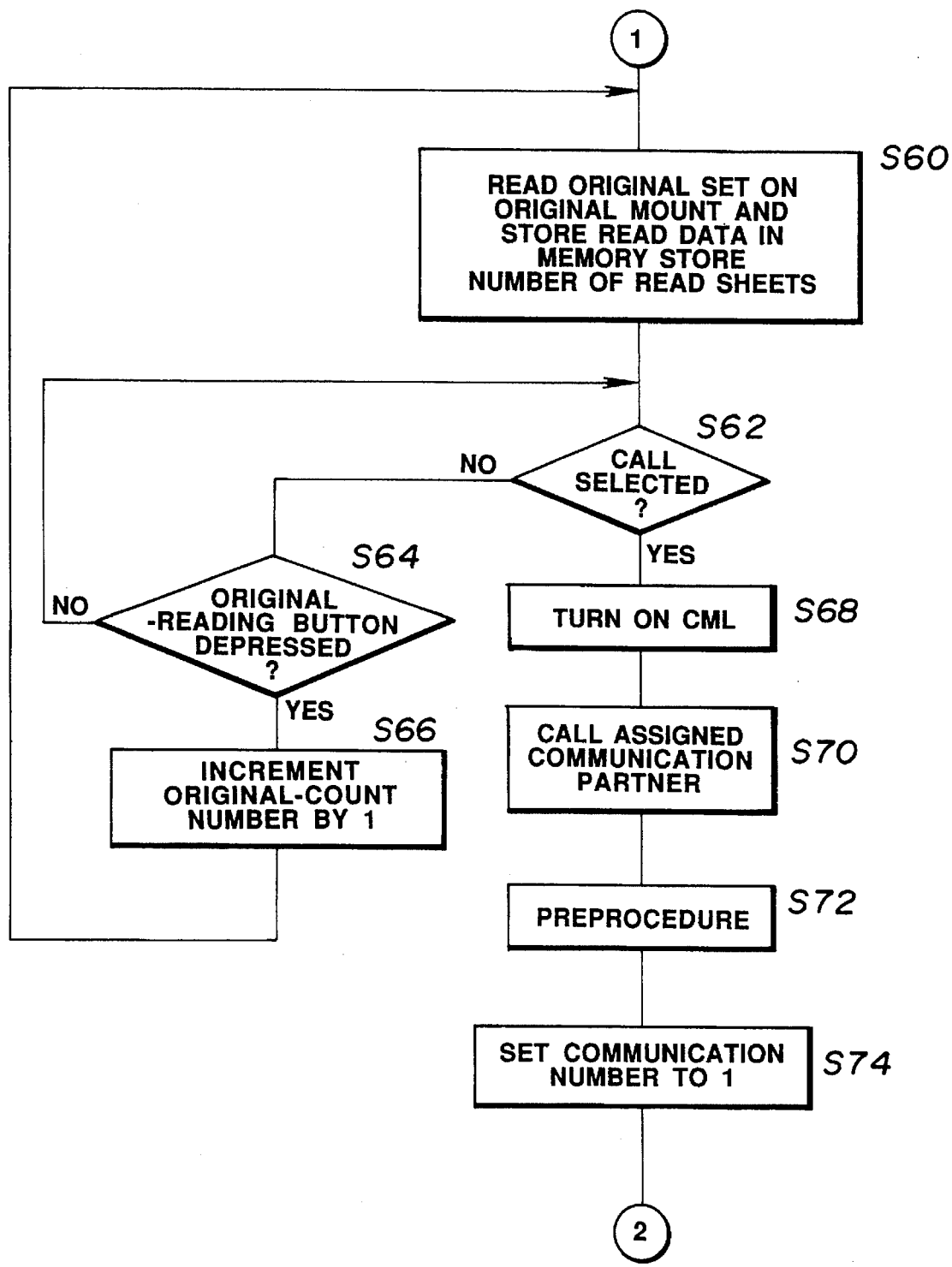
Figure 4:
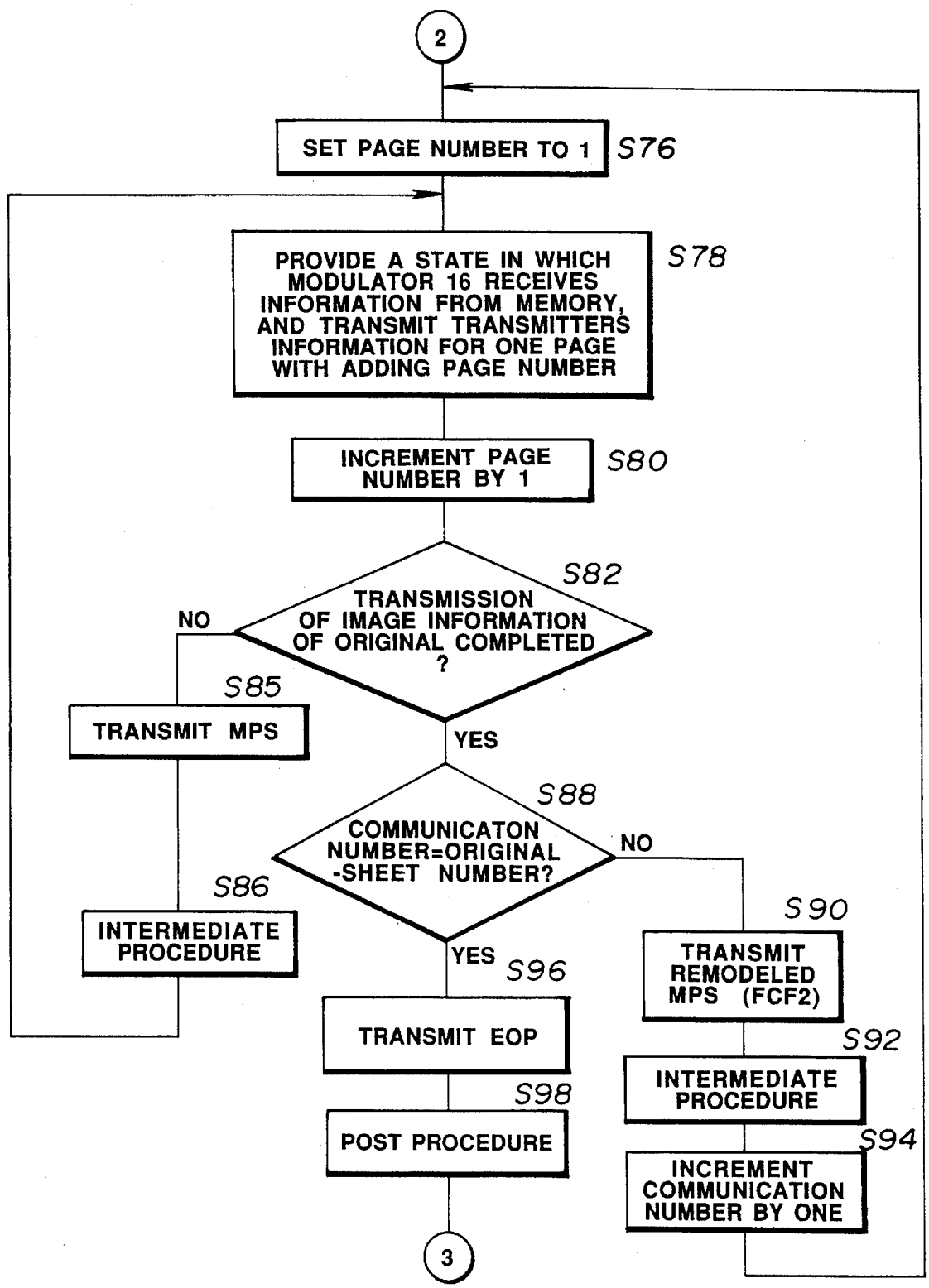

FIGS. 2 through 4 are flowcharts showing the control operation of control circuit 38.

First, in step S42, a signal of signal level "0" is output on signal line 38a to turn off the CML of NCU 2. In step S44, a signal of signal level "0" is output on signal line 38c to provide a state in which modulator 18 receives information from encoding circuit 12. In step S48, a signal of signal level "0" is output on signal line 38f to provide a state in which sheets of recording paper recorded by recording circuit 28 are not stored in the sorter. In step S48, a clearing pulse is output on signal line 38g to turn off batch processing lamp 32.

Next, in step S50, a signal on signal line 34a is input to control circuit 38 to determine whether or not original-reading button 34 has been depressed. If the result of the determination is affirmative, the process proceeds to step S56. If the result of the determination is negative, the process proceeds to step S52.

In step S52, control circuit 38 determines whether or not processing other than reading of the original has been selected. If the result of the determination is affirmative, the selected other processing is performed (step S54), and the process returns to step S42. If the result of the determination is negative, the process returns to step S50, where control circuit 38 determines whether or not original-reading button 34 has been depressed.

If the result of the determination in step S50 is affirmative, in step S56, 1 is set in an original-count counter for counting the number of the original stored in memory circuit 14. In step S58, the signal on signal line 32a is input to determine whether or not batch processing lamp 32 is lit. If the result of the determination is negative, that is, if batch processing is not instructed, the process returns to step S42 after reading the original at step S59. In step S59, the original is read, and image information of the original is transmitted.

If the result of the determination in step S58 is affirmative, that is, if batch processing is selected, in step S60, signals of signal level "1" are output on signal line 38b to read image information from the original set on the original mount, and on signal line 38h to store the read information in memory circuit 14, respectively. In this reading operation, the number of sheets of each original is stored corresponding to the number of the set original.

Next, in step S62, control circuit 38 determines whether or not a call has been selected using a one-touch dial button, an abbreviation dial button, ten-key dial buttons or the like. If the result of the determination is affirmative, the process proceeds to step S68. If the result of the determination is negative, the process proceeds to step S64.

In step S64, the signal on signal line 34a is input to determine whether or not original-reading button 34 has been again depressed. If the result of the determination is affirmative, the value of the original-count counter is incremented by one in step S66, and the process returns to step S60, where sheets of the next original are read. If the result of the determination in step S64 is negative, the process proceeds to step S62, where the selection of a call is awaited.

When a call has been selected, a signal of signal level "1" is output on signal line 38a to turn on the CML (step S68), and the assigned communication partner is called (step S70).

If there is a response from the communication partner, a preprocedure, comprising commands, information exchange and the like for confirming respective functions possessed by the transmitter and the receiver, is executed (step S72) to start the process of transmitting image information of one or more originals stored in memory circuit 14 in a single communication operation. First, 1 is set in a communication-number counter for selecting image information of an original (step S74). In addition, 1 is set in a page-number counter in order to transmit image information of each original begining at the first page.

Next, in step S78, a signal of signal level "1" is output on signal line 38c to input information stored in memory circuit 14 to modulator 16, and transmission of one page is performed, adding the page number to the transmitted information. Then, the value of the page-number counter is incremented by one (step S80), and control circuit 38 determines whether or not the transmission of image information of that original has been completed, that is, whether or not the number of read sheets of the original being transmitted equals the page number of the corresponding communication number (step S82). If the result of the determination is negative, a normal MPS signal (which is a procedure signal indicating the presence of the next page when transmission of one page has been completed), is transmitted (step S84), an intermediate procedure, comprising the exchange of commands between pages, is performed (step S86), and the process returns to step S78.

If the result of the determination in step S82 is affirmative, in step S88, control circuit 38 determines whether or not all image information stored in memory circuit 14 has been transmitted, that is, whether or not the final value of the original-number counter obtained during the operation of storing image information of the plurality of originals coincides with the current value of the cummunication-number counter.

If the result of the determination is affirmative, an EOP (end of procedure) signal is transmitted (step S96), a postprocedure, comprising the exchange of commands for disconnecting the network when the communication operation has been completed, is performed (step S98), and the process returns to step S42.

If the result of the determination in step S88 is negative, a remodeled MPS signal (a remodeled MCF signal (an MCF signal is a signal indicating that the image has been normally received) obtained by providing a normal MPS signal with FCF2), which is a procedure signal, is transmitted (step S90) to notify the receiver's apparatus that the signal represents a border between originals. Then the intermediate procedure is performed (step S92), the value of the communication-number counter is incremented by one (step S94), and the process returns to step S76, where the page number is set again to 1 and image information of the next original is transmitted.

Control circuit 38 generates characters representing a page number which are transmitted through signal line 38b and are synthesized with image information of a sheet of the original read by reading circuit 10 to provide the transmitted information.

Figure 5:
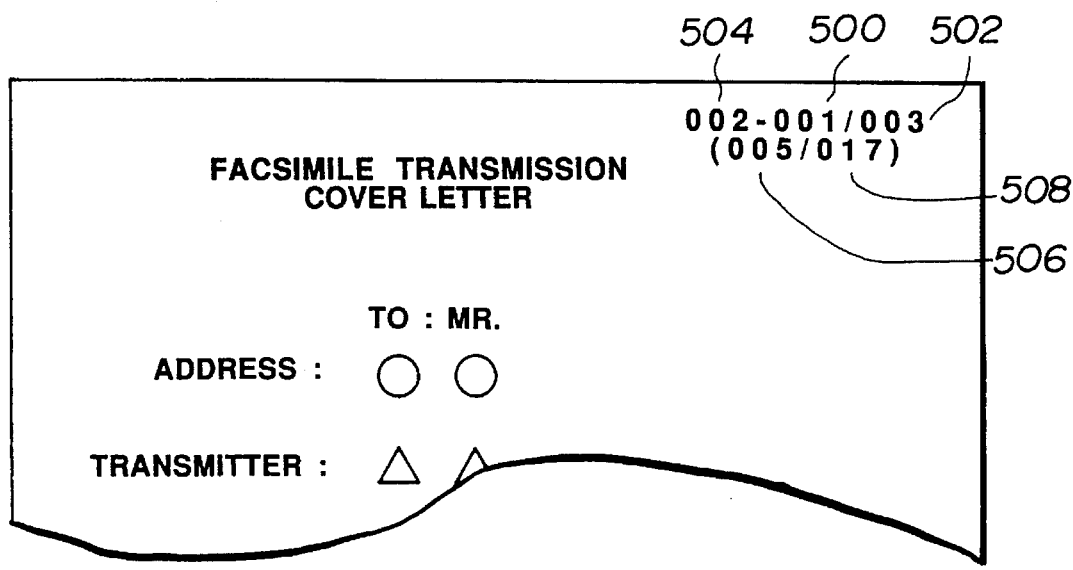
FIG. 5 is a diagram illustrating an image recorded by the receiver's apparatus.

FIG. 5 is a diagram illustrating a record provided by a receiver's apparatus on which image information obtained by synthesizing characters representing a page number with image information of a sheet of an original in a transmitter's apparatus is recorded.

In FIG. 5, reference numeral 500 represents a page number obtained by performing counting according to the flowchart shown in FIGS/ 2 through 4. Page number 500 is reset to 001 for the first page of a new original. Thus, the receiver can recognize a page of each original. Reference numeral 502 represents the number of sheets for each original number stored in step S60. Reference numeral 504 represents the number of an original. The receiver can thereby know to which original each sheet belongs. Even if the sheet is mixed among sheets of another original, the receiver can easily discriminate the sheet from other sheets. Reference numeral 506 represents a page number in one communication operation. Even if the sheet is the first page of an original, a page number in the entire communication operation is recorded. Hence, the receiver can arrange received sheets in the sequence of image reception even when the order of the received sheets has been changed. Reference numeral 508 represents the total number of sheets to be transmitted in a single communication operation.

Although in the above-described embodiment only the page number is set to page 1 when information of a new original is transmitted, any other transmitted information may be used. For example, an abbreviated name of the destination may be transmitted.

In the above-described embodiment, when identifying a border between originals using a Q signal, which is a signal output at the end of an page, in a single communication operation, a mode change is not permitted, but only the MPS signal and the EOM signal are changed. However, a mode change may be permitted between originals using, for example, an EOM (end of message) signal.

Alternatively, a border between originals may be identified in the preprocedure by notifying the communication partner's apparatus of the number of originals and the number of pages in each original included in a communication operation to be performed.

In the above-described embodiment, if an error is produced in the course of communication, information of an original (all pages of which have been transmitted) may not be retransmitted, and transmission may be started from information of the leading page of an original which has not yet been completely transmitted. Thus, it is possible to improve, for example, the efficiency of the communication by omitting retransmission of originals which have been properly transmitted.

Figure 6:
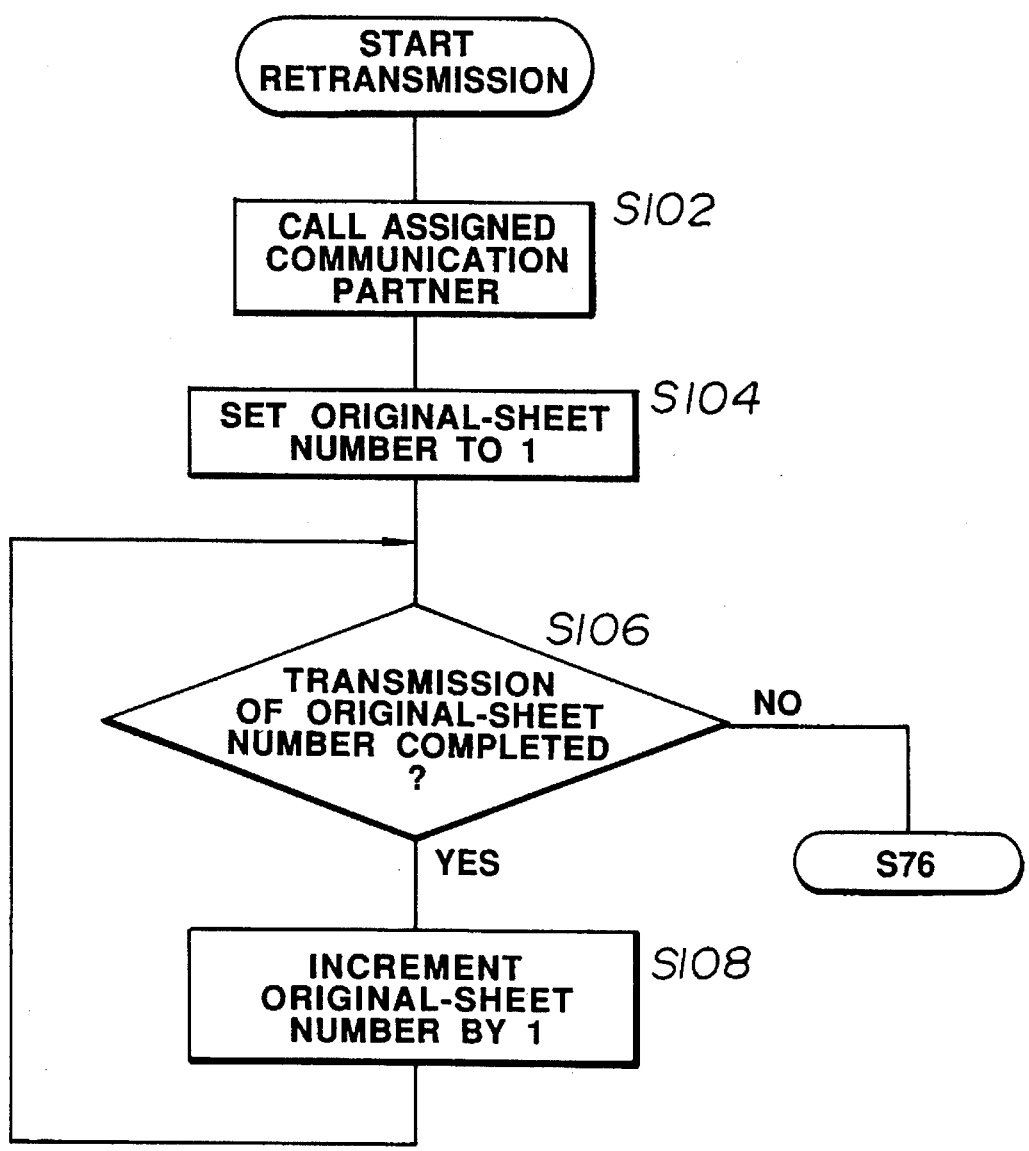
FIG. 6 is a flowchart showing the operation of a second embodiment of the present invention.

FIG. 6 is a flowchart showing the operation in such a case. When an error has been produced in the course of communication and retransmission has been selected as described above, this operation is performed.

First, a communication partner where an error has been produced in the course of communication is called (step S102), and 1 is set in the original-number counter for retransmission (step S104). Control circuit 38 determines whether or not the transmission of information of the original having the corresponding number has been completed without producing an error (step S106). If the result of the determination is affirmative, the value of the original-number counter for retransmission is incremented by one (step S108). If the result of the determination is negative, the process is returned to the above-described step S76. After step S76, information of sheets of the original after the original indicated by the value of the original-number counter for retransmission is transmitted.

In the above-described embodiment, only the transmission operation has been described, and a description has not been provided of the reception operation. In the receiver's apparatus, however, a border between originals in a single communication operation may be detected and classified.

Figure 7:
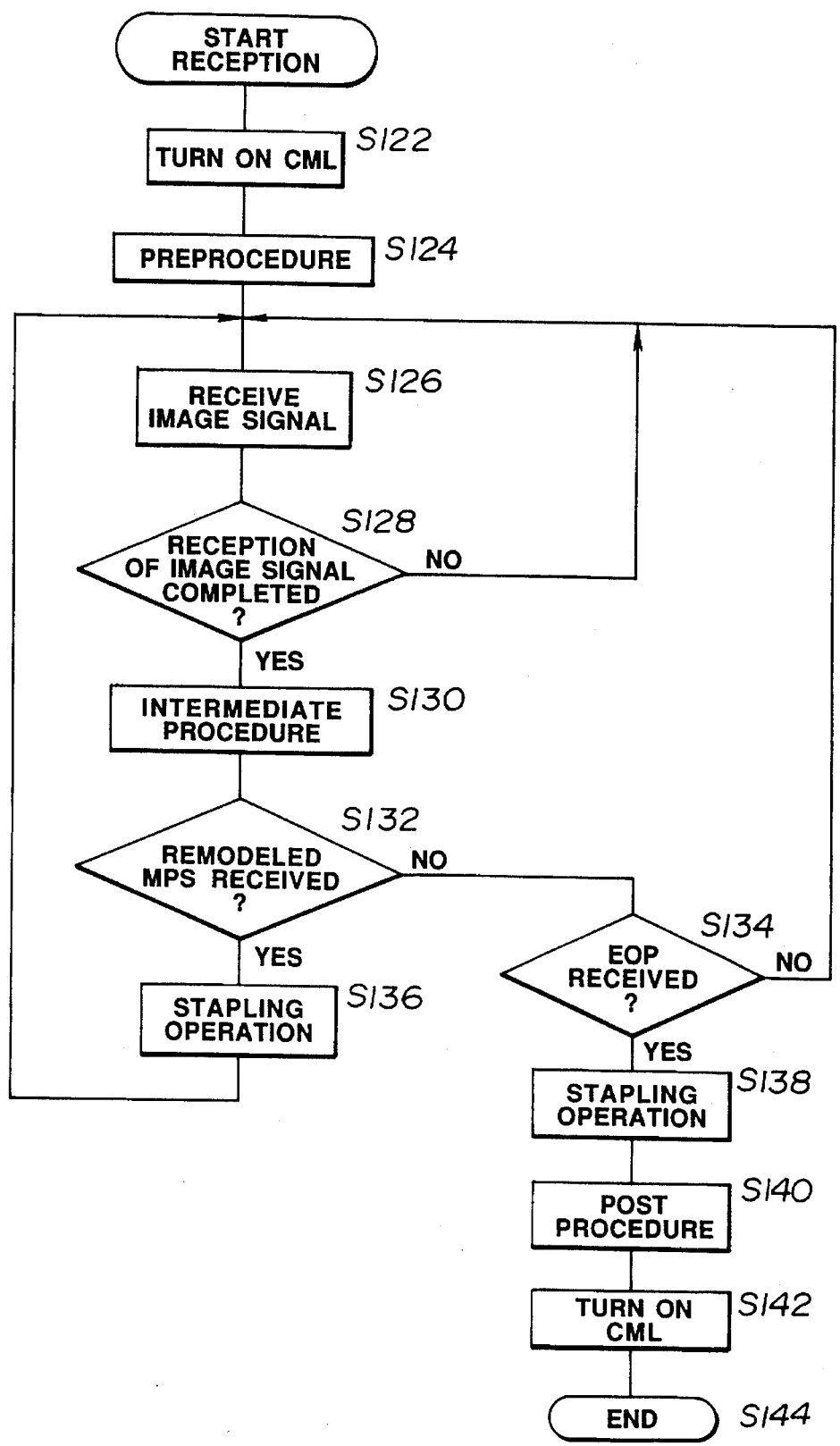
FIG. 7 is a flowchart showing the operation of a third embodiment of the present invention.

As one of methods of such classification, a case in which sheets of each original are stapled using a stapler will be described with reference to the flowchart shown in FIG. 7.

This operation is started when reception has been selected. First, a signal of signal level "1" is output on signal line 38a to turn on the CML (step S122). Then the preprodure is performed (step S124), and an image signal is received (step S126). After the completion of reception of an image signal for one page (step S128), the intermediate procedure is performed (step S130).

When a an MPS signal remodeled as described above (a remodeled MPS signal) has been received (step S132), a stapling command pulse is output to signal line 38e to perform a stapling operation for information of an original in the course of communication (step S136). When an EOP signal has been received (step S134), a stapling operation for information of an original is also performed (step S138). Then postprocedure is performed (step S140), a signal of signal level "0" is output on signal line 38a to turn off the CML (step S142), and the process is terminated (step S144).

In place of stapling, any other operation may be adopted provided that sheets of an original can be bound.

Alternatively, the receiver may classify originals by changing bins of the sorter in accordance with a remodeled MPS signal.

Figure 8:
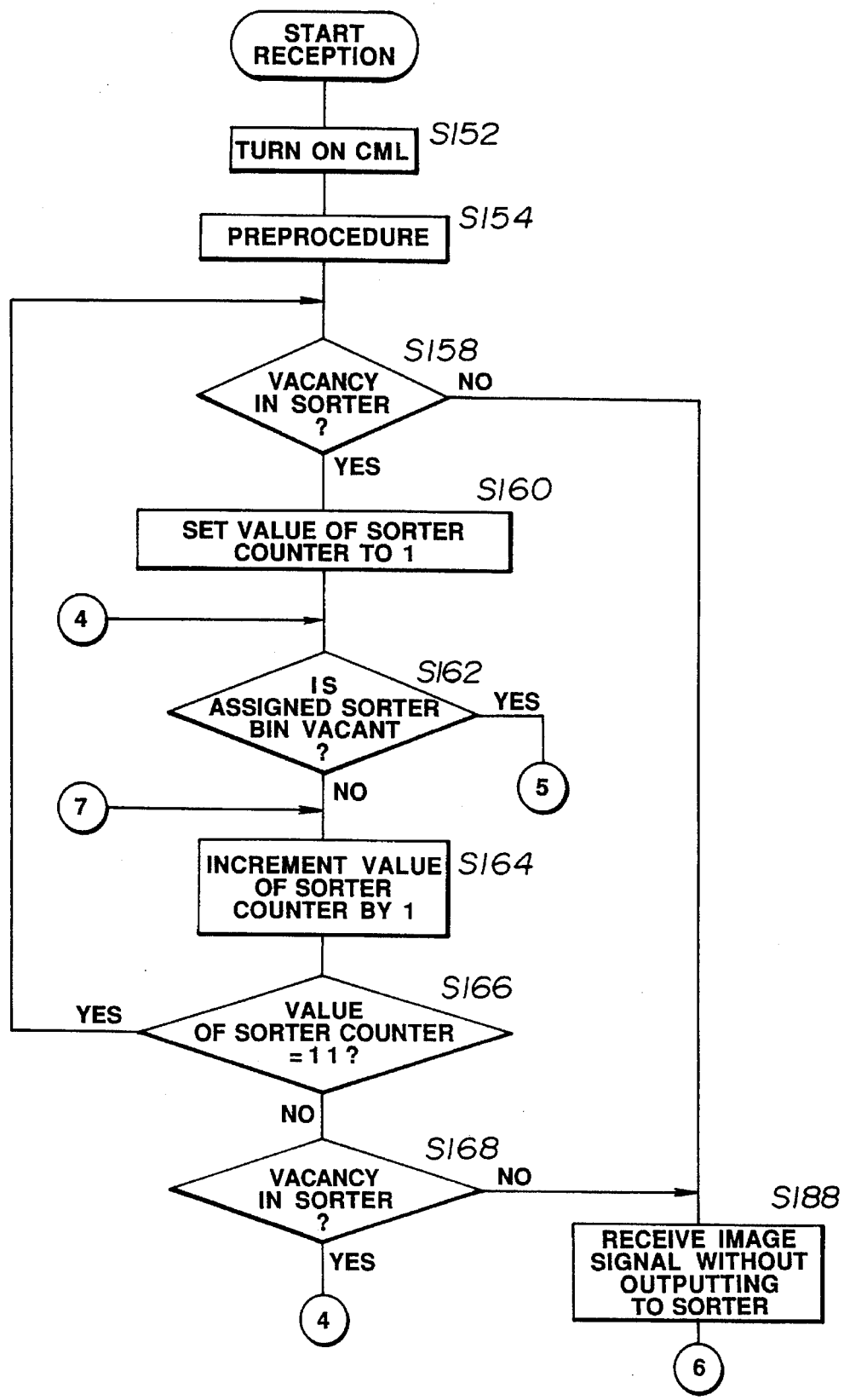
FIGS. 8 and 9 are flowcharts showing the operation of a fourth embodiment of the present invention.
Figure 9:
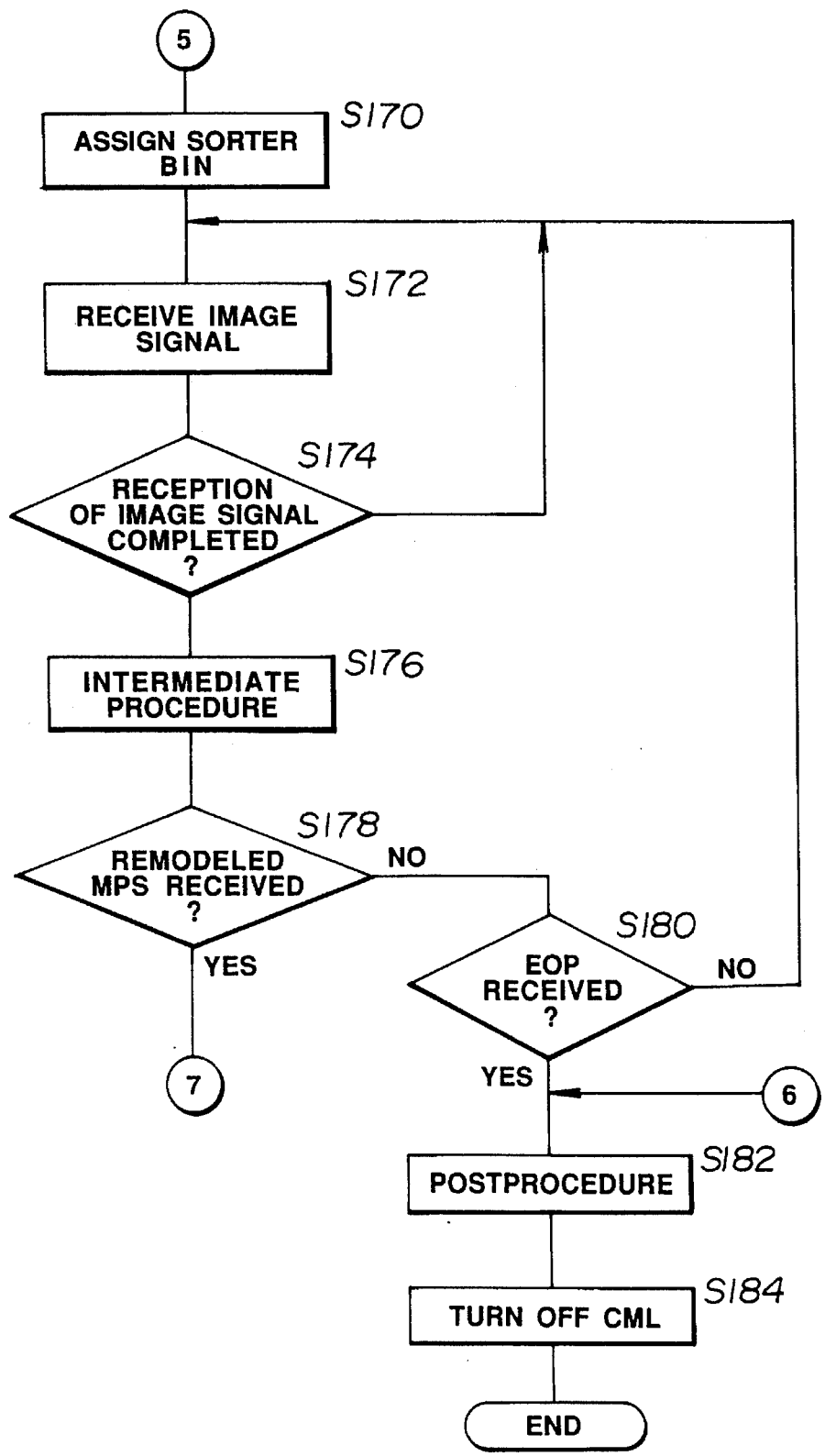

FIGS. 8 and 9 are flowcharts showing a specific example of such classification control.

This operation is started when a reception has been selected. First a signal of signal level "1" is output to signal line 38a to turn on the CML (step S152). Then the preprocedure is performed (step S154), and control circuit 38 determines whether or not there is a vacancy in the sorter according to the signal on signal line 28a (step S158). If the result of the determination is affirmative, the process proceeds to step S160. If the result of the determination is negative, the process proceeds to step S188.

In step S160, 1 is set in a sorter counter. In step S162, control circuit 38 determines whether or not the sorter bin assigned by the sorter counter is vacant. If the result of the determination is affirmative, the sorter bin for storing sheets of output paper having received images is assigned through signal line 38f (step S170).

If the result of the determination in step S162 is negative, the value of the sorter counter is incremented by one (step S164). If the value of the sorter counter becomes 11 in step S166, the process returns to step S158. If the value of the sorter counter is not 11, the process proceeds to step S168.

In step S168, the signal on signal line 28a is input to determine whether or not there is a vacancy in the sorter. If the result of the determination is affirmative, the process returns to step S162. If the result of the determination is negative, the process proceeds to step S188.

In step S172, an image signal is received. When the reception of an image signal for one page has been completed (step S174), the intermediate procedure is performed in step S176.

When a remodeled MPS signal has been received in step S178, the process returns to step S164, where sheets of output paper having received images after the next page are stored in the next sorter bin. When an EOP signal has been received in step S180, postprocedure is performed in step S182. Then, a signal of signal level "0" is output to signal line 38a to turn off the CML (step S184), and the reception processing is terminated.

In step S188, an image signal is received without outputting to the sorter.

Figure 10:
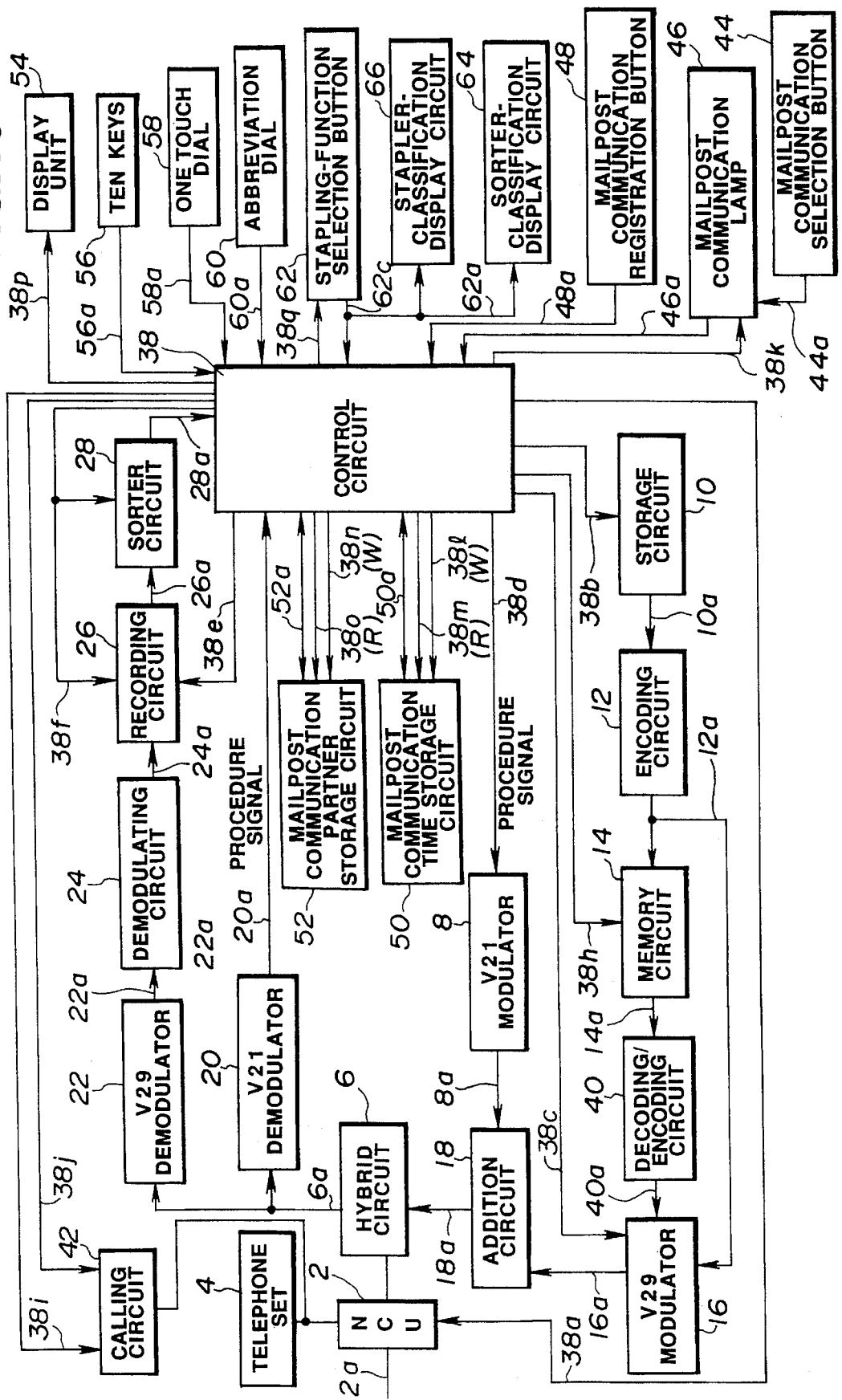
FIG. 10 is a block diagram illustrating a facsimile apparatus according to a fifth embodiment of the present invention.
Figure 11:
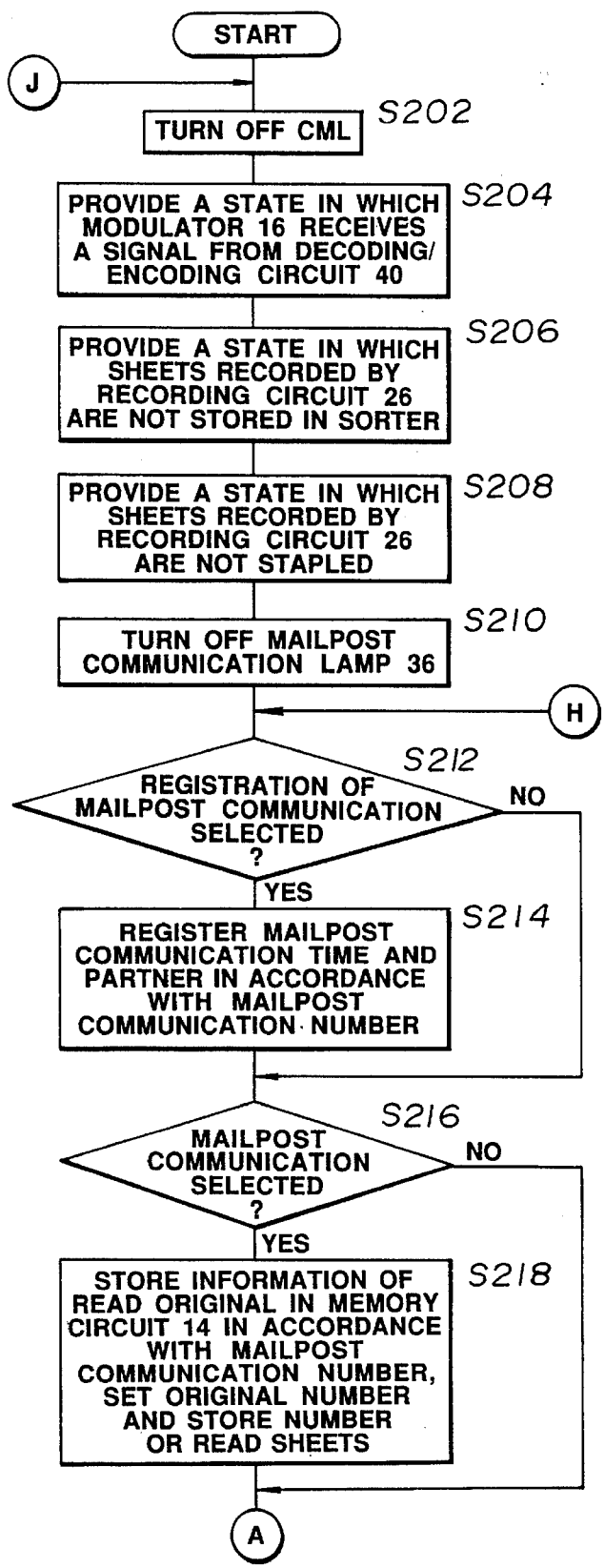
FIGS. 11 through 16 are flowcharts showing the operation of the fifth embodiment.

FIG. 10 is a block diagram illustrating a facsimile apparatus according to a fifth embodiment of the present invention. In FIG. 10, the same components as in the first embodiment (FIG. 1) are indicated by the same reference numerals.

In the fifth embodiment, decoding/encoding circuit 40 is provided between memory circuit 14 and modulator 16. Decoding/encoding circuit 40 inputs encoded data from memory circuit 14, first decodes the input data, encodes again the decoded data in accordance with the parameters (the size of recording paper, the line density and the like) of the communication partner's apparatus, and outputs the encoded data to modulator 16 via signal line 40a. Modulator 16 selects between the input from encoding circuit 12 and the input from decoding/encoding circuit 40 in accordance with the signal on signal line 38c.

When control circuit 38 generates a call command pulse on signal line 38i, calling circuit 42 inputs dial information output to signal line 38j and transmits a selection signal to NCU 2.

Mailpost communication selection button 44 is used to select mailpost communication. If button 44 is depressed, a depression pulse is generated on signal line 44a.

Mailpost communication lamp 46 provides a display when mailpost communication is executed. Lamp 46 is turned off when a clearing pulse has been generated on signal line 38k, and thereafter repeats turning-on-and-off every time a pulse is generated on signal line 44a. When mailpost communication lamp 46 is turned off, a signal of signal level "0" is output to signal line 46a. When mailpost communication lamp 46 is lit, a signal of signal level "1" is output to signal line 36a.

Mailpost communication registration button 48 is used for registering mailpost communication, more specifically, for registering a communication partner to be called and the time of a call corresponding to a mailpost communication number. When button 48 is depressed, a depression pulse is generated on signal line 48a.

Mailpost communication time storage circuit 50 stores the time of mailpost communication corresponding to a mailpost communication number. Numerals 1 through 5 are used for the mailpost communication number.

The time of mailpost communication corresponding to a mailpost communication number is stored in storage circuit 50 by sequentially outputting mailpost communication number n, a space, and mailpost communication time hh:mm (for example, 12:00) corresponding to mailpost communication number n to signal line 50a followed by generating a write pulse on signal line 38l.

The time of mailpost communication corresponding to mailpost communication number n stored in storage circuit 50 is read by outputting mailpost communication number n to signal line 50a followed by generating a read pulse on signal line 38m. Thus, storage circuit 50 outputs the mailpost communication time stored corresponding to mailpost communication number n to signal line 50a.

Mailpost communication partner storage circuit 52 stores a mailpost communication partner corresponding to a mailpost communication number. Numerals 1 through 5 are used for the mailpost communication number.

The mailpost communication partner corresponding to a mailpost communication number is stored in storage circuit 50 by sequentially outputting mailpost communication number n, a space, and the mailpost communication partner number corresponding to mailpost communication number n to signal line 52a followed by generating a write pulse on signal line 38n.

The mailpost communication partner corresponding to mailpost communication number n stored in storage circuit 52 is read by outputting mailpost communication number n to signal line 52a followed by generating a read pulse on signal line 38o. Thus, storage circuit 52 outputs the mailpost communication partner stored corresponding to mailpost communication number n to signal line 52a.

Display unit 54 displays a mailpost number when mailpost communication has been selected, a time and the communication partner corresponding to the mailpost number when registering the mailpost communication partner and the time, and a page number when displaying the page number at the receiver, and the like by inputting information output from control circuit 38 to signal line 38p.

In the present embodiment, ten digit keypad 56 is used for, for example, registering the time of a normal dialing operation or mailpost communication. Information provided by depressing keys of keypad 56 is output to signal line 56a.

One-touch dial 58 is used for registering information of a communication partner in each one-touch key and performing a one-touch dialing operation. Information provided by depressing a one-touch key is output to signal line 58a.

Abbreviation dial 60 is used for registering information of the communication partner corresponding to each abbreviated number, and performing a dialing operation by assigning a two-digit abbreviated number by an abbreviation dialing operation. If an abbreviation key is depressed, a depression pulse is generated on signal line 60a. An abbreviation dialing operation is performed by depressing an abbreviation key followed by depressing two-digit numerical information using ten keys 56.

When signal "1", "2" or "3" is output to signal line 38q, stapling-function selection button 62 outputs the signal without modifying it to signal line 62a. Normally, signal "0" is output to signal line 38q. The current signal level is checked every time stapling-function selection button 62 is depressed. The signal level is updated, for example, to "2", "3" and "1" if the checked value is "1", "2" and "3", respectively. The updated signal is output to signal line 62a.

Sorter-classification display circuit 64 displays on display unit 54 that classification by the sorter is to be executed when signal "2" is output on signal line 62a by operating stapling-function selection button 62.

Stapler-classification display circuit 66 displays on display unit 54 that classification by the stapler is to be executed when signal "3" is output to signal line 62a by operating stapling-function selection button 62.

In the present embodiment, when mailpost communication has been selected by the transmitter, control circuit 38 provides a notification that mailpost communication is being executed if the communication partner's apparatus has the function of displaying mailpost communication, and also provides an indication of a border between consecutive communication operations.

When mailpost communication notification has been provided, the receiver causes that fact to be displayed, and also displays the page number on display unit 54 starting from page 1 for each communication operation. The receiver can select from among three types of methods of classifying received information, i.e., "classification not performed", "classification by stapling" and "classification by a sorter". Hence, it is possible to perform automatic classification by stapling or by sorter while recognizing a border between consecutive comminication operations.

FIGS. 11 through 16 are flowcharts showing the operation of the present embodiment.

First, in step S202, control circuit 38 outputs a signal of signal level "0" to signal line 38$a$ to turn off the CML. Thereafter in step S204, a signal of signal level "0" is output to signal line 38$c$ to provide a state in which modulator 16 inputs a signal from decoding/encoding circuit 40 (via signal line 40$a$). In step S206, a signal of signal level "0" is output to signal line 38$f$ to provide a state in which sorter circuit 28 does not function.

In step S208, a signal of signal level "0" is output to signal line 38$q$ to provide a state in which a stapling function is not selected. In step S210, a clearing pulse is generated on signal line 38$k$ to turn off mailpost communication lamp 46.

Next, in step S212, control circuit 38 determines whether or not registration of mailpost communication has been selected. If the result of the determination is affirmative, processing of registering the time of mailpost communication and the communication partner's telephone number corresponding to the mailpost communication number is performed (step S214). The procedure of registering mailpost communication is as follows.

First, when the operator has depressed mailpost communication registration button 48, display unit 54 displays the "input mailpost communication number". Then, the operator inputs any numeral from 1 to 5 using the keypad 56 to set the mailpost communication number.

Then, display unit 54 displays "input the time". The operator sequentially inputs hh:mm using keypad 56, and the input value is stored in storage circuit 50.

Then display unit 54 displays "input the communication partner". The operator inputs the communication partner's telephone number by inputting two-digit numerals using keypad 56, one-touch key 58, or abbreviation dial 60 and keypad 56, and the input number is stored in storage circuit 52. Thus, the registration of the communication partner of mailpost communication and the time of the communication is completed. Every day, at time hh:mm, mailpost communication is executed for the partner in batch processing, if data corresponding to the mailpost communication number are stored in memory circuit 14.

If the result of the determination in step S212 is negative, in step S216, control circuit 38 determines whether or not mailpost communication has been selected. If the result of the determination is affirmative, the process of storing image data read from the original in memory circuit 14 corresponding to the mailpost communication number is started.

The selection of mailpost communication is performed as follows.

First, the operator depresses mailpost communication selection button 44 to turn on mailpost communication lamp 36.

Then, display unit 54 displays "input the mailpost communication number". The operator inputs any numeral from 1 to 5 using keypad 56 to set the mailpost communication number. Then, display unit 54 displays the communication partner having the corresponding mailpost communication number with which mailpost communication is to be performed, and also displays the time of the communication.

After confirming the communication partner and the time, the operator depresses the start key. Thus, the process of reading the original and storing read data in memory circuit 14 is started.

When the data are stored in memory circuit 14, the original number for each original to be read is set for each mailpost communication number, and the number of read sheets is stored for each original number (step S218).

Figure 12:
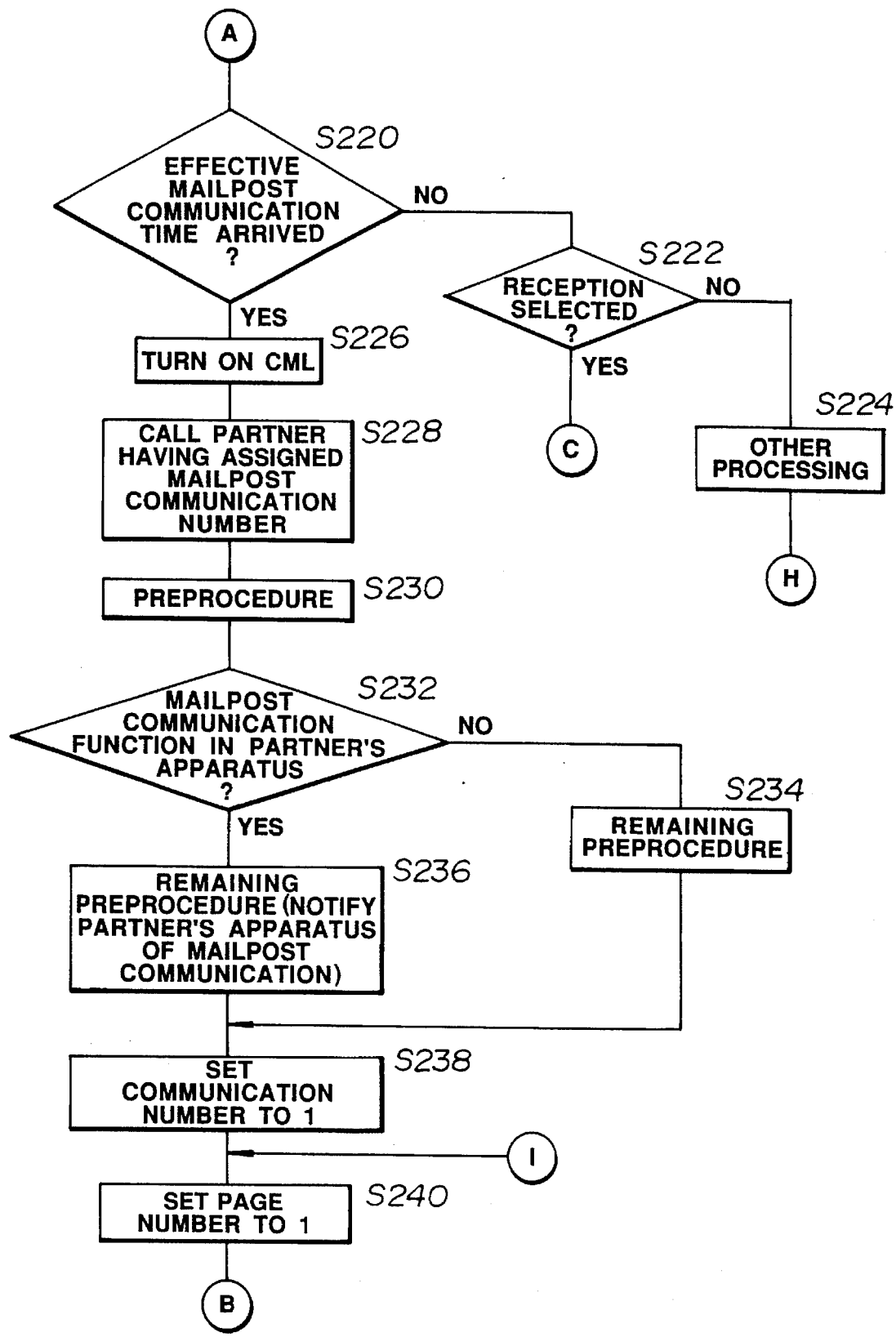
Figure 13:
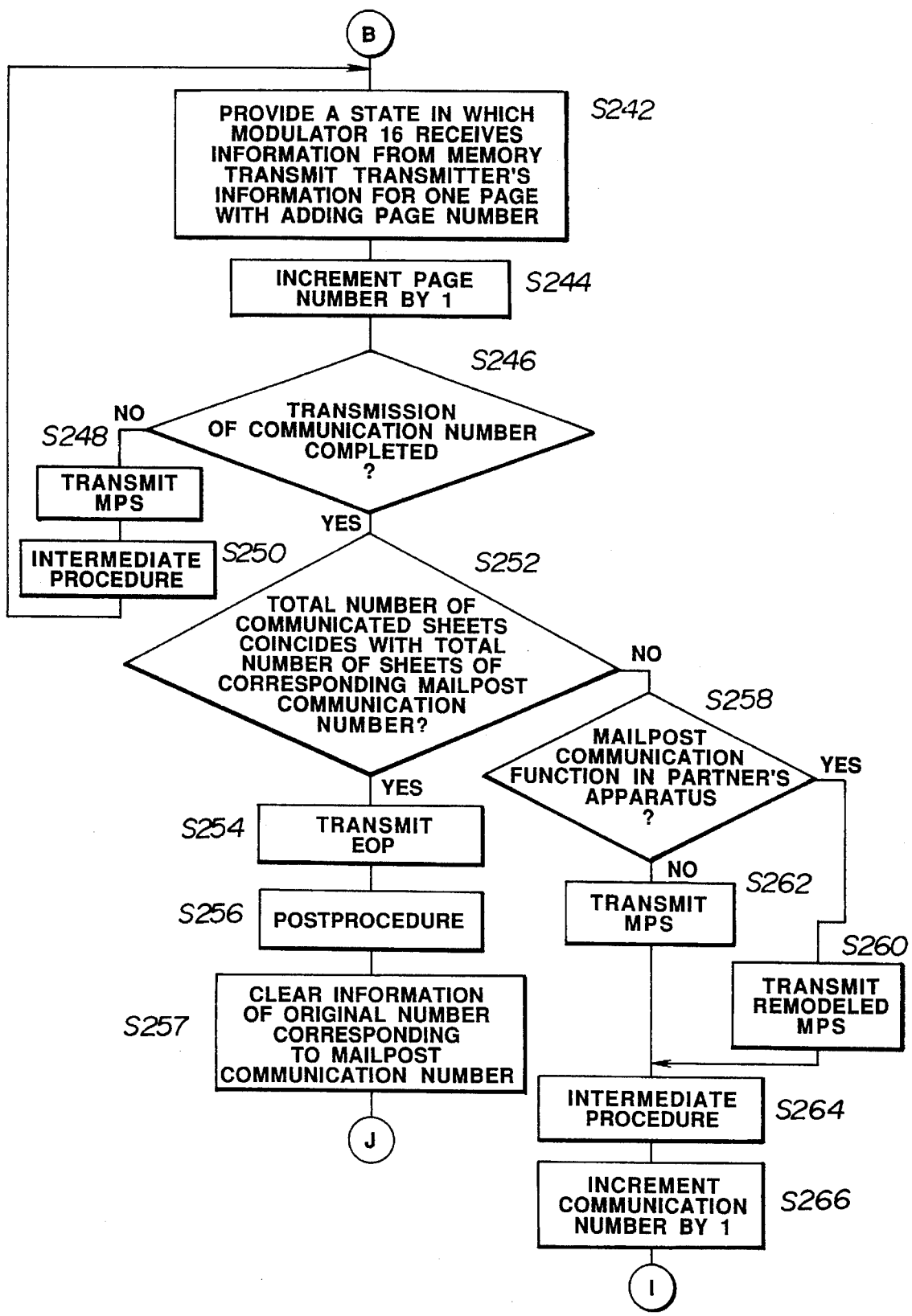
Figure 14:
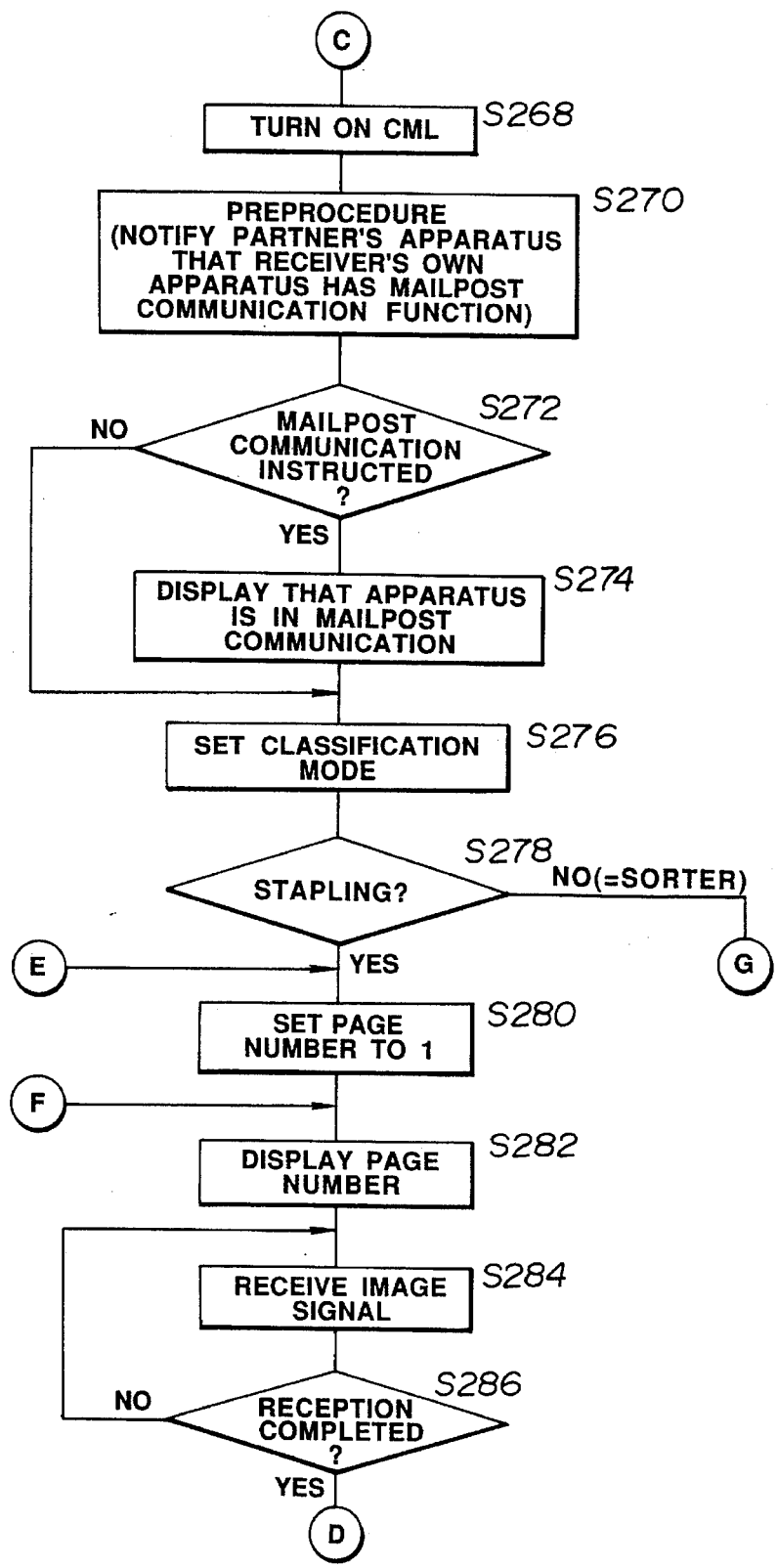
Figure 15:
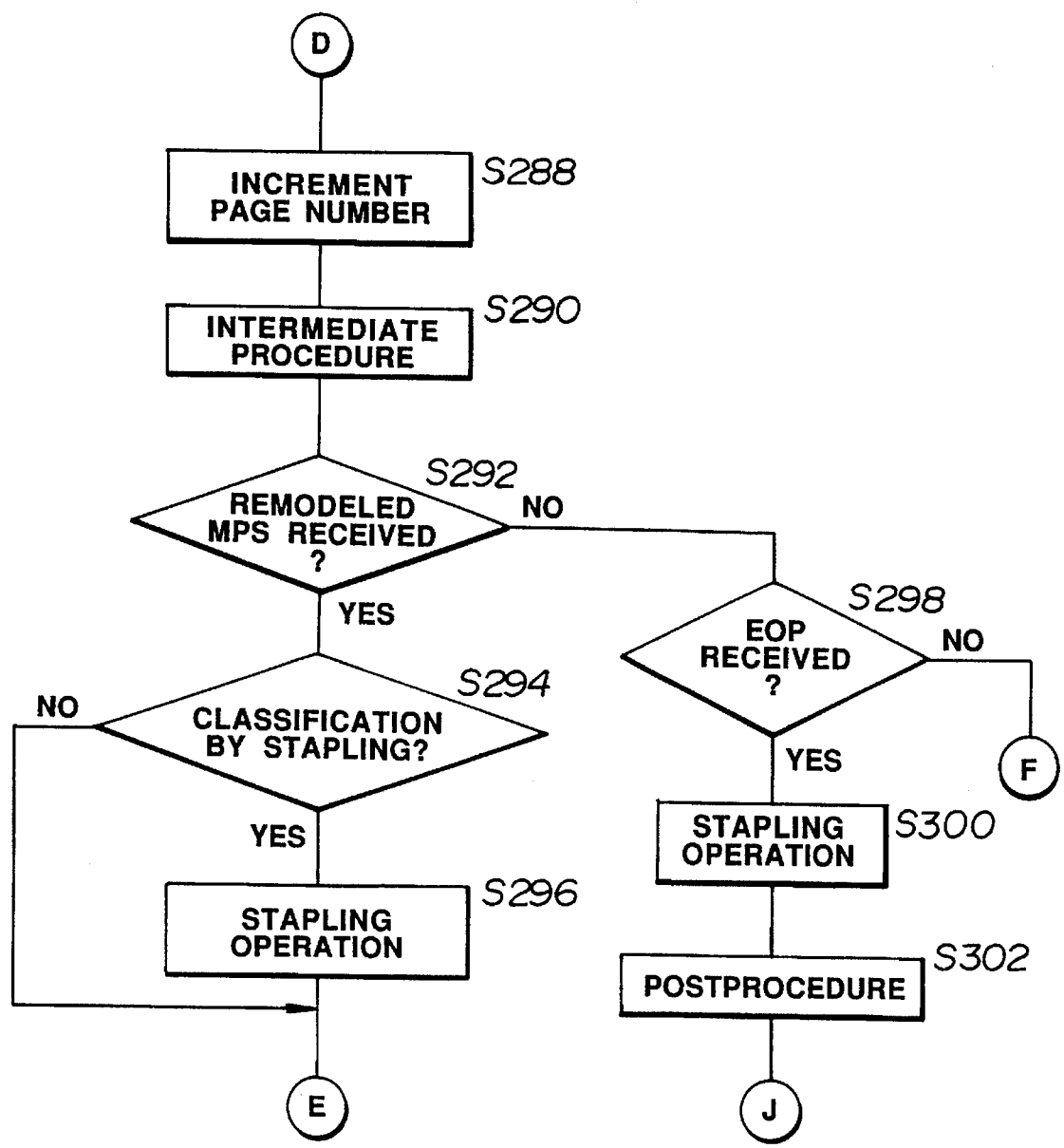
Figure 16:
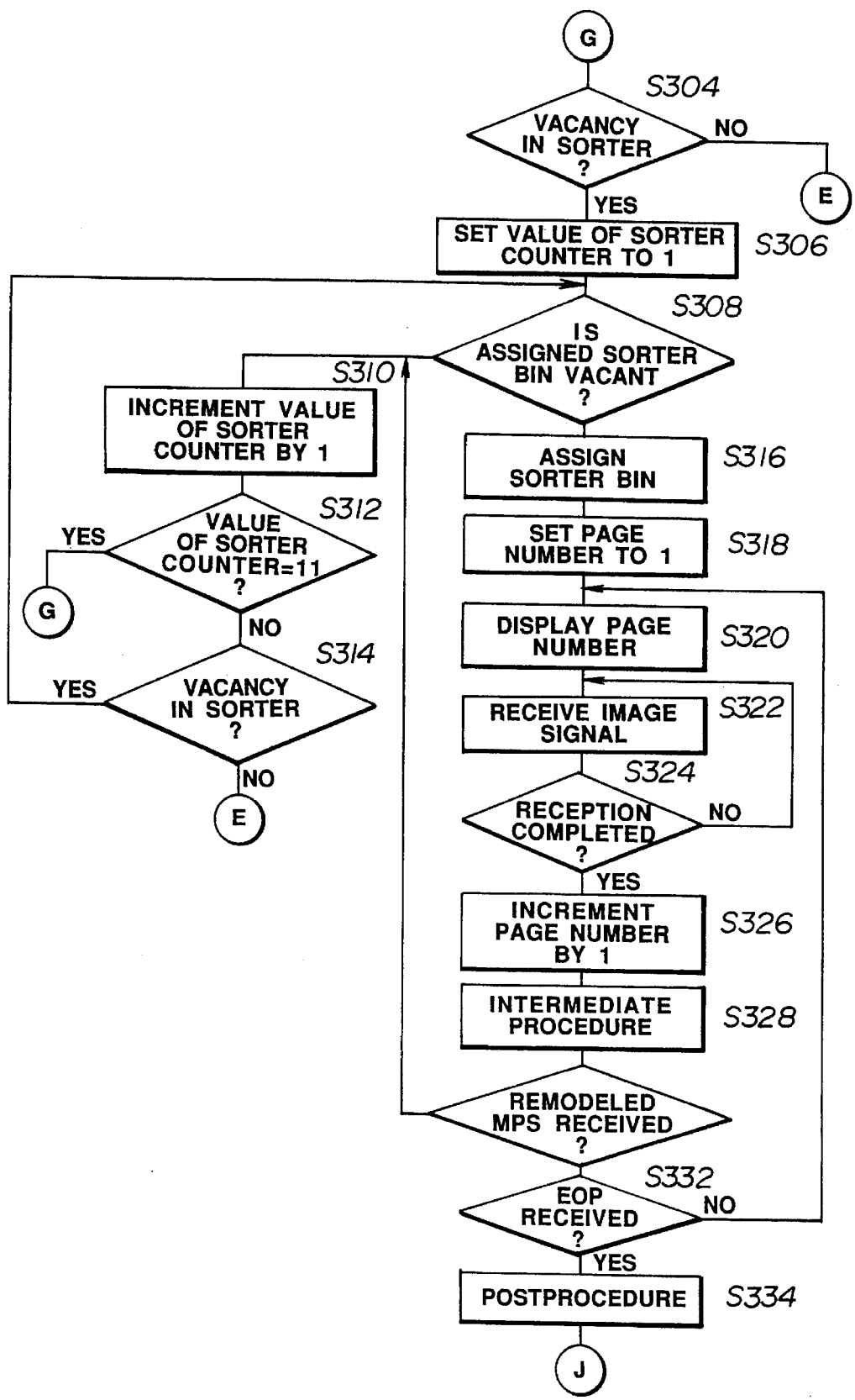

If the result of the determination in step S216 is negative, in step S220, control circuit 38 determines whether or not the communication time has arrived for any of the mailpost communication numbers, and data to be transmitted are stored for the corresponding mailpost communication number. In FIG. 12, the expression "the effective mailpost communication time arrived?" is used.

If data are stored for the mailpost communication number for which the communication time has arrived, the process proceeds to step S226. If data are not stored, the process proceeds to step S222.

In step S222, control circuit 38 determines whether or not reception has been selected. If the result of the determination is affirmative, the process proceeds to step S268. If the result of the determination is negative, other processing is performed (step S224).

In step S226, a signal of signal level "1" is output on signal line 38$a$ to turn on the CML. In step S228, the communication partner corresponding to the assigned mailpost communication number is input from storage circuit 52, and the assigned partner is called by calling circuit 42.

Next, in step S230, the preprocedure is performed. In the preprocedure, control circuit 38 determines whether or not the partner's apparatus has the capabilities of displaying mailpost communication and recognizing a border between originals (step S232). If the result of the determination is affirmative, the process proceeds to step S236, where the remaining preprocedure of notifying the partner's apparatus of mailpost communication is carried out. If the result of the determination is negative, the process proceeds to step S234, where the remaining usual preprocedure is performed without a mailpost communication.

After the completion of the preprocedure, a single mailpost communication operation of a plurality of communication information (information of a plurality of read originals) stored in the memory is performed for each mailpost communication number. First, 1 is set in a communication-number counter for counting the number of transmitted information strings (step S238).

Then in step S240, 1 is set in a page-number counter in order to count the number of pages from page 1 for each communication information string (information of each read original). In step S242, data stored in memory circuit 14 are decoded again by the above-described decoding/encoding circuit 40, and transmission for one page is performed from among image data encoded in accordance with the format of the partner's apparatus including adding page numbers to the transmitted information.

After the completion of transmission of one page, the page number is incremented by one in step S244.

Next, in step S248, control circuit 38 determines whether or not the transmission of information of the corresponding communication number has been completed, that is, whether or not the number of read sheets added to the original number corresponding to the current communication number coincides with the page number of information which has been completely transmitted in step S242. If the result of the determination is negative, an MPS signal is transmitted (step S248), the intermediate procedure is performed (step S250), and the process proceeds to the transmission of the next page.

If the result of the determination in step S246 is affirmative, in step S252, control circuit 38 determines whether or not the transmission of all stored information of the corresponding mailpost communication number has been completed, that is, whether or not the total number of communicated sheets equals the total number of sheets of the corresponding mailpost communication number stored in the memory.

If the result of the determination is affirmative, an EOP signal is transmitted (step S254), the postprocedure is performed (step S258), and data of the original numbers corresponding to the mailpost communication number are cleared (step S257).

If the result of the determination in step S252 is negative, the process proceeds to step S258, where a control process determines whether or not the partner's apparatus has the capabilities of displaying mailpost communication and recognizing a border between consecutive communication information strings. If the result of the determination is affirmative, a remodeled MPS signal (more specifically, an MCF signal obtained by providing a normal MPS signal with FCF2) representing a border between consecutive communication information strings is transmitted (step S260).

If the result of the determination in step S258 is negative, a normal MPS signal is transmitted (step S262), and intermediate processing is performed (step S264). In step S266, the value of the communication-number counter is incremented by one, and the process returns to step S240, where the same transmission processing is repeated.

When reception has been selected in step S222, first in step S268, a signal of signal level "1" is output to signal line 38a to turn on the CML.

Then the preprocedure is executed in step S270. In the preprocedure, the partner's apparatus is notified that the receiver's own apparatus has the capabilities of displaying mailpost communication and recognizing a border (using a remodeled MPS signal) between originals.

Next, in step S272, control circuit 38 determines whether or not mailpost communication has been selected at the transmitter's apparatus. If the result of the determination is affirmative, display unit 54 displays that the apparatus is in a "mailpost communication" mode (step S274). If the result of the determination is negative, the process proceeds to step S276.

In step S276, control circuit 38 receives data output to signal line 62a by the operation of stapling-function selection button 62, and stores the data as the classification mode. In step S278, a determination is made as to whether the classification mode is a non-stapling mode (mode "1") or a stapling mode (mode "3"). If the mode is the stapling mode, the process proceeds to step S280. If the mode is not the stapling mode, but is a mode of classifying by sorter (mode "2"), the process proceeds to step S304.

In step S280, 1 is set in the page-number counter for counting the page number of the corresponding information. In step S282, the page number is displayed on display unit 54, and the operator is notified of the number of pages of the corresponding information (information of the corresponding original).

In step S284, an image signal is received. After the reception of the image signal for one page has been completed (step S288), the page number is incremented by one (step S288), and the intermediate procedure is performed (step S290).

Next, in step S292, control circuit 38 determines whether or not a remodeled MPS signal for representing a border between consecutive information strings has been received. If the result of the determination is affirmative, the process proceeds to step S294. If the result of the determination is negative, the process proceeds to step S298.

In step S294, control circuit 38 inputs the classification mode stored in step S278, and determines whether or not the classification by stapling (mode "3") has been selected. If the result of the determination is affirmative, the process proceeds to step S296, where a stapling command pulse is output to signal line 38e, and a stapling operation for one information string (information of one original) in mailpost communication is performed.

In step S298, control circuit 38 determines whether or not an EOP signal has been received. If the result of the determination is affirmative, a stapling operation for one information string is performed in the same manner as described above (step S300), and the postprocedure is performed (step S302). If the result of the determination is negative, the process returns to the above-described step S282, where the same processing is repeated.

If the determination in the above-described step S278 is the classification by sorter (mode "2"), in step S304, a signal on signal line 28e is input from sorter circuit 28 to determine whether or not a vacancy is present in the sorter. If the result of the determination is negative, the process proceeds to step S280, where the apparatus is controlled so as not to perform classification by stapling.

If the result of the determination in step S304 is affirmative, the process proceeds to step S306, where 1 is set in the sorter counter. In step S308, control circuit 38 determines whether or not the assigned bin is vacant. If the result of the determination is affirmative, the sorter bin for storing received data is assigned via signal line 38f (step S316).

If the result of the determination in step S308 is negative, the value of the sorter counter is incremented by one (step S310). In step S312, control circuit 38 determines whether or not the value of the sorter counter equals 11. If the result of the determination is affirmative, the process returns to step S304. If the result of the determination is negative, the process proceeds to step S314.

In step S314, as in the above-described step S304, the signal on signal line 28a is input to determine whether or not a vacancy is present in the sorter. If the result of the determination is affirmative, the process returns to step S308. If the result of the determination is negative, the process returns to step S280, where the apparatus is controlled so as not to perform classification by stapling.

After assigning the sorter bin in the above-described step S316, 1 is set in the page-number counter in step S318, and the page number is displayed on display unit 54 in step S320. The operator is notified of the page number in one information string (information of one original).

In step S322, an image signal is received. If the reception of an image signal for one page has been completed (step S324), the page number is incremented by one (step S326), and the intermediate procedure is performed (step S328).

In step S330, control circuit 38 determines whether or not a remodeled MPS signal representing a border between consecutive information strings has been received. If the result of the determination is affirmative, the process proceeds to step S310. If the result of the determination is negative, the process proceeds to step S332.

In step S332, control circuit 38 determines whether or not an EOP signal has been received. If the result of the determination is affirmative, the postprocedure is performed (step S334). If the result of the determination is negative, the process returns to step S320.

In the above-described fifth embodiment, classification is not performed when no vacancy is present in the sorter even though classification by sorter has been selected by the receiver' a apparatus. In such a case, however, classification by stapling may be performed.

In the fifth embodiment, in mailpost communication reception, the page number is assumed to start from page 1 for each information string. However, a remodeled MPS signal may include an abbreviated name of a user for assigning a receiver, and this abbreviated name may be displayed.

In the fifth embodiment, a mode change is not permitted, and only the MPS signal and the EOS signal are changed. However, the EOM signal may also be changed in the case where a mode change is permitted, and a remodeled EOM signal (a signal indicating a border between consecutive information strings) may be transmitted.

Figure 17:
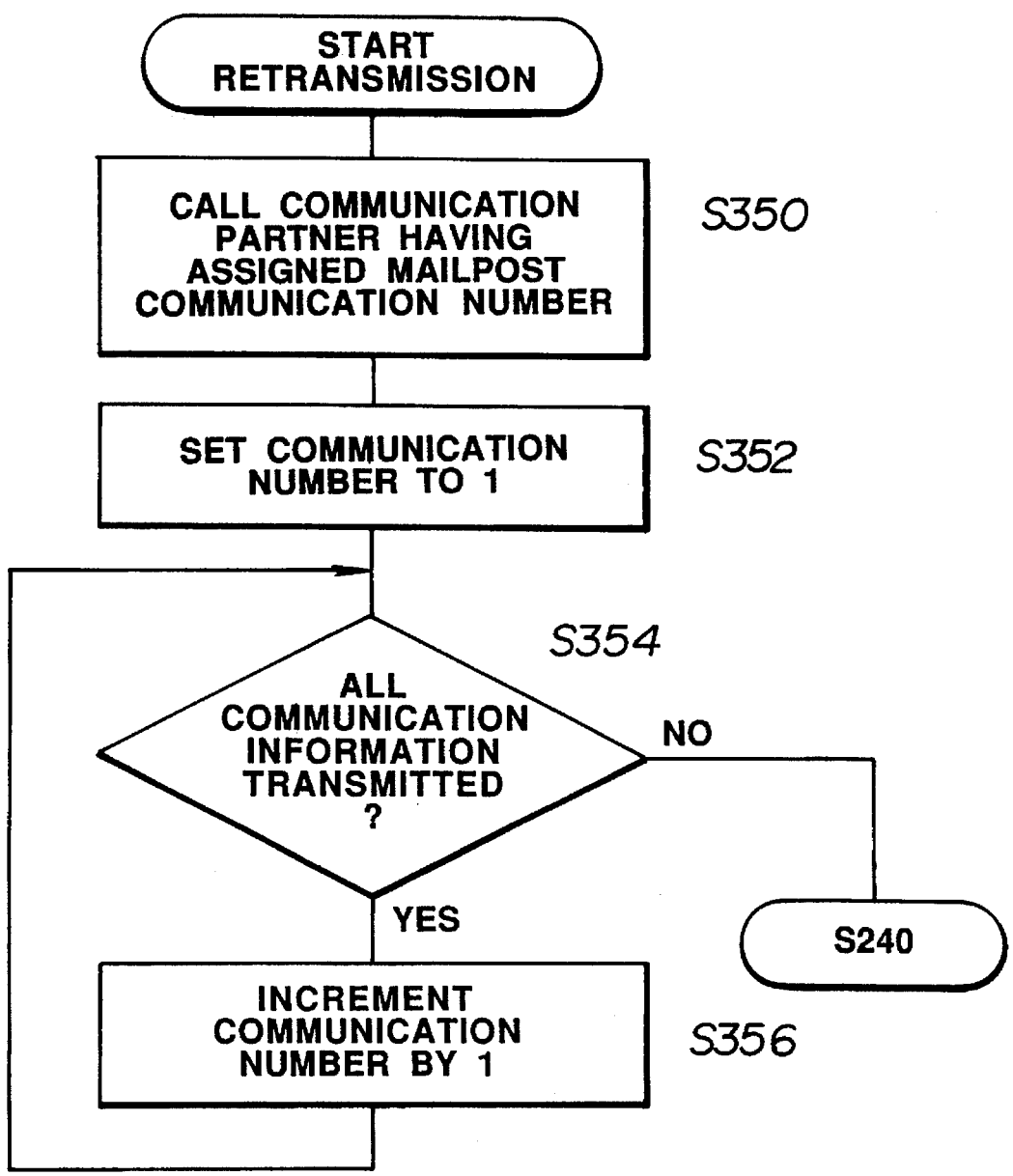
FIG. 17 is a flowchart showing the operation of a sixth embodiment of the present invention.

Next, a description will be provided of a retransmission operation when an error is produced in the course of communication with reference to FIG. 17. In this retransmission operation, information strings which have been completely transmitted are not transmitted, and transmission is started from an information string which has not been completely transmitted.

In FIG. 17, if an error has been produced in the course of communication and retransmission has been selected, in step S350, the communication partner having the mailpost communication number for which retransmission processing has been requested due to the occurrence of the error in the course of communication is called using calling circuit 42.

In step S352, 1 is set in the communication-number counter. In step S354, control circuit 38 determines whether or not the data of this communication number have been transmitted without producing an error. If the result of the determination is affirmative, the communication number is incremented by one (step S358). If the result of the determination is negative, the process returns to step S240. After step S240, information strings after the assigned communication number are transmitted.

Some of the above-described embodiments may be combined together.

When the receiver's apparatus for performing recording on recording paper while counting page numbers has received a remodeled MPS signal, the page number may be reset to 1.

As described above, by notifying the receiver's apparatus of a border between information strings of read originals, the receiver's apparatus can peform classification by stapling or sorter at each border.

Furthermore, even if an error is produced in the course of one communication operation, information after the information string of an original having the error is retransmitted. It is thereby possible to retransmit an information string in which an error has been produced without causing trouble for the receiver, and to reduce the communication cost.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A facsimile apparatus for transmitting a plurality of groups of originals, each group comprising a plurality of originals, in a single communication operation, said apparatus comprising:

reading means for reading images of originals;

recognition means for recognizing a border between groups of originals read by said reading means; and transmission means for sequentially transmitting the images of the plurality of originals read by said reading means to a destination having a sorting function, and for transmitting a signal representing an instruction which activates the sorting function of the destination when a border between transmitted images of sheets corresponds to the border between the groups recognized by said recognition means.

2. A facsimile apparatus according to claim 1, wherein said transmission means performs mailpost transmission wherein transmission is performed at a predetermined time.

3. A facsimile apparatus according to claim 1, wherein said transmission means retransmits images of sheets of originals after the signal representing the border if an error is produced in the course of image transmission.

4. A facsimile apparatus according to claim 1, wherein said transmission means transmits information indicating a page number of sheets of at least one original.

5. A facsimile apparatus according to claim 1, further comprising an input button for inputting an instruction indicating a border between originals, wherein said recognition means recognizes the border between the originals by the instruction input from said input button.

6. A facsimile apparatus for transmitting a plurality of groups of originals, each group comprising a plurality of originals, in a single communication operation, said apparatus comprising:

reading means for reading images of originals;

recognition means for recognizing a border between groups of originals read by said reading means; and transmission means for sequentially transmitting the images of the plurality of originals read by said reading means, and for transmitting a procedure signal representing a border between the groups when a border between transmitted images of sheets corresponds to the border between the groups recognized by said recognition means, wherein said transmission means transmits information indicating a page number of sheets of at least one original, and wherein said transmission means resets the page number of sheets of an original every time said recognition means recognizes a border between originals.

7. A method for transmitting a plurality of groups of originals, each group comprising a plurality of originals, in a single communication operation, said method comprising steps of:

reading images of originals;

recognizing a border between groups of originals read by said reading step; and sequentially transmitting the images of the plurality of originals read by said reading step, and for transmitting a procedure signal representing a border between the groups when a border between transmitted images of sheets corresponds to the border between the groups recognized by said recognition step, wherein said step of sequentially transmitting transmits information indicating a page number of sheets of at least one original, and wherein said step of sequentially transmitting resets the page number of sheets of an original every time said recognition step recognizes a border between originals.

8. A facsimile apparatus for receiving a plurality of groups of originals, each group comprising a plurality of originals, in a single communication operation, said apparatus comprising:

reception means for receiving images of the plurality of originals and signals indicating borders between the respective groups;

recording means for recording the images of the originals received by said reception means on recording sheets; and sorting means for sorting recording sheets for one communication into a plurality of groups and switching, in accordance with the signals indicating the borders between the respective groups, which one out of a plurality of bins the recording sheets are to be stored in.

9. A facsimile apparatus for receiving a plurality of groups of originals, each group comprising a plurality of originals, in a single communication operation, said apparatus comprising:

reception means for receiving images of the plurality of originals and signals indicating borders between the respective groups;

recording means for recording the images of the originals received by said reception means on recording sheets; and binding means for binding the recording sheets on which the recording is performed by said recording means in accordance with the signals indicating the borders between the respective groups received by said reception means, wherein said binding means divides recording sheets for one communication into a plurality of groups.

10. A method for transmitting a plurality of groups of originals, each group comprising a plurality of originals, in a single communication operation, said method comprising the steps of:

reading images of originals;

recognizing a border between groups of originals read by said reading means; and sequentially transmitting the images of the plurality of originals read at said reading step to a destination having a sorting function, and transmitting a signal representing an instruction which activates the sorting function of the destination when a border between transmitted images of sheets corresponds to the border between the groups recognized at said recognizing step.

11. A method according to claim 10, wherein said step of sequentially transmitting performs mailpost transmission wherein transmission is performed at a predetermined time.

12. A method according to claim 10, wherein said step of sequentially transmitting retransmits images of sheets of originals after the signal representing the border if an error is produced in the course of image transmission.

13. A method according to claim 10, wherein said step of sequentially transmitting transmits information indicating the number of originals corresponding to the number of orders between originals recognized by said recognition step.

14. A method according to claim 13, wherein the information indicating the number of the originals is transmitted before starting the transmission of the images of the originals.

15. A method according to claim 10, wherein said step of sequentially transmitting transmits information indicating a page number of sheets of at least one original.

16. A method according to claim 10, further comprising an input step for inputting an instruction indicating a border between originals, wherein said recognition step recognizes the border between the originals by an instruction input from an input step.

17. A method for receiving a plurality of groups of originals, each group comprising a plurality of originals, in a single communication operation, said method comprising the steps of:

receiving images of the plurality of originals and signals indicating borders between the respective groups;

recording the images of the originals received at said receiving step on recording sheets; and sorting recording sheets for one communication into a plurality of groups and switching, in accordance with the signals indicating the borders between the respective groups, which one out of a plurality of bins the recording sheets are to be stored in.

18. A method for receiving a plurality of groups of originals, each group comprising a plurality of originals, in a single communication operation, said method comprising the steps of:

receiving images of the plurality of originals and signals indicating borders between the respective groups;

recording the images of the originals received at said receiving step on recording sheets; and binding the recording sheets on which the recording is performed at said recording step in accordance with the signals indicating the borders between the respective groups at said receiving step, said binding step dividing recording sheets for one communication into a plurality of groups.

* * * * *

UNITED STATES PATENT AND TRADEMARK OFFICE
CERTIFICATE OF CORRECTION

PATENT NO. : 5,535,015

DATED : July 9, 1996

INVENTOR(S): TAKEHIRO YOSHIDA

It is certified that error appears in the above-identified patent and that said Letters Patent is hereby corrected as shown below:

COLUMN 6

Line 42, "cummunication-number" should read
--communication-number--.

COLUMN 7

Line 8, "FIGS/2" should read --FIGS. 2--.

COLUMN 8

Line 18, "a an" should read --an--.

COLUMN 11

Line 7, "comminication" should read --communication--.

COLUMN 12

Line 62, "step S248," should --Step S246,--.

UNITED STATES PATENT AND TRADEMARK OFFICE
CERTIFICATE OF CORRECTION

PATENT NO. : 5,535,015

DATED : July 9, 1996

INVENTOR(S): TAKEHIRO YOSHIDA

It is certified that error appears in the above-identified patent and that said Letters Patent is hereby corrected as shown below:

COLUMN 13

Line 16, "(step S258)," should read --(step S256),--.

COLUMN 14

Line 13, "step S278," should read --step S276,--.

COLUMN 15

Line 13, "receiver' a" should read --receiver's--.
Line 45, "(step S358)." should read --(step S356).--.

UNITED STATES PATENT AND TRADEMARK OFFICE
CERTIFICATE OF CORRECTION

PATENT NO. : 5,535,015

DATED : July 9, 1996

INVENTOR(S): TAKEHIRO YOSHIDA

It is certified that error appears in the above-identified patent and that said Letters Patent is hereby corrected as shown below:

<u>COLUMN 16</u>

Line 63, "steps" should read --the steps--.

Signed and Sealed this

Eleventh Day of February, 1997

Attest:

BRUCE LEHMAN

*Attesting Officer*     *Commissioner of Patents and Trademarks*